United States Patent
Yokokura et al.

(10) Patent No.: US 7,886,790 B2
(45) Date of Patent: Feb. 15, 2011

(54) RUN-FLAT TIRE

(75) Inventors: Hiroyuki Yokokura, Kodaira (JP); Hidenobu Akahane, Kodaira (JP); Yugo Zuigyo, Kokubunji (JP); Daisuke Maehara, Kodaira (JP); Masahiko Yamamoto, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 788 days.

(21) Appl. No.: 11/795,516

(22) PCT Filed: Jan. 20, 2006

(86) PCT No.: PCT/JP2006/300862
§ 371 (c)(1),
(2), (4) Date: Jul. 18, 2007

(87) PCT Pub. No.: WO2006/077973
PCT Pub. Date: Jul. 27, 2006

(65) Prior Publication Data
US 2008/0156409 A1    Jul. 3, 2008

(30) Foreign Application Priority Data

| Jan. 21, 2005 | (JP) | ............................. 2005-014157 |
| Jan. 21, 2005 | (JP) | ............................. 2005-014202 |
| Sep. 16, 2005 | (JP) | ............................. 2005-270831 |

(51) Int. Cl.
| B60C 17/00 | (2006.01) |
| B60C 9/00  | (2006.01) |
| B60C 9/04  | (2006.01) |
| B60C 13/00 | (2006.01) |
| B60C 15/06 | (2006.01) |
| D02G 3/48  | (2006.01) |

(52) U.S. Cl. ..................... 152/517; 152/451; 152/543; 152/555; 152/556; 428/394

(58) Field of Classification Search ................ 152/451, 152/517, 543, 555, 556; 428/394
See application file for complete search history.

(56) References Cited

U.S. PATENT DOCUMENTS
2008/0099118 A1 *    5/2008    Akahane et al.

FOREIGN PATENT DOCUMENTS
JP          2000-198307 A        7/2000

(Continued)

OTHER PUBLICATIONS

English machine translation of JP 2004-218189 A, Aug. 5, 2004.*

*Primary Examiner*—Adrienne C Johnstone
(74) *Attorney, Agent, or Firm*—Sughrue Mion, PLLC

(57) ABSTRACT

This invention relates to a tire having an improved durability in the run-flat running without damaging the ride comfort in the usual running, and more particularly to a run-flat tire comprising a sidewall portion provided with a side reinforcing rubber layer having a crescent shape at section wherein a cord layer including a polyketone fiber cord satisfying the following conditions of the following equations (I) and (II):

$$\sigma \geq -0.01 \times E + 1.2 \quad (I)$$

$$\sigma \geq 0.02 \quad (II)$$

[wherein $\sigma$ is a thermal shrinkage stress at 177° C. (cN/dtex) and E is an elastic modulus at 25° C. under a load of 49 N (cN/dtex)] is disposed in at least a part of a region A ranging from a belt end to a maximum width part of a tire side portion and a region B ranging from a neighborhood of a bead core to a bead filler.

20 Claims, 13 Drawing Sheets

FOREIGN PATENT DOCUMENTS

| | | |
|---|---|---|
| JP | 2000-264012 A | 9/2000 |
| JP | 2001295134 A * | 10/2001 |
| JP | 2004-218189 A | 8/2004 |
| JP | 2004-306658 A | 11/2004 |

* cited by examiner

RUN-FLAT TIRE

TECHNICAL FIELD

This invention relates to a run-flat tire, and more particularly to a run-flat tire of a side reinforcement type in which the durability in the run-flat running is largely improved without damaging the ride comfort in the usual running.

RELATED ART

As a tire capable of safely running over a certain distance without losing an ability bearing a load of the tire even if an internal pressure of the tire is dropped due to the puncture or the like or a so-called run-flat tire, there have hitherto been proposed various kinds of run-flat tires of side reinforcement type such as a tire wherein a side-reinforcing rubber layer having a relatively high modulus and a crescent shape at section is disposed in an inner face of a carcass at a sidewall portion of the tire (which may also be called as side portion) to enhance a rigidity of the sidewall portion and hence the load can be born without extremely increasing the flexible deformation of the sidewall portion in the dropping of the internal pressure, a tire wherein the sidewall portion is reinforced with various reinforcing members, and so on (see JP-A-2000-264012, JP-A-2002-500587, JP-A-2002-500589 and JP-A-2004-306658).

In the conventional run-flat tires of side reinforcement type, however, the deflection of the tire is large in the run-flat running and also the temperature of the sidewall portion during the run-flat running becomes higher and hence the rigidity of the sidewall portion is lowered due to the softening of the rubber to further make the deflection larger, and as a result, the troubles at the last stage of the run-flat running are mainly caused due to the cracking of the side reinforcing rubber layer having the crescent shape at section. Therefore, the conventional run-flat tires of the side reinforcement type have a problem that the durable distance in the run-flat running is short.

On the other hand, cellulose fibers such as rayon and the like are high in the elasticity at room temperature and high in the adhesiveness to rubber, so that they are used as a reinforcing member for various rubber articles including a cord for the reinforcement of the tire. Also, the cellulose fibers have a heat dimensional stability that the Young's moduli at room temperature and higher temperatures are higher than those of polyester such as PET or the like and the heat shrinkage at 177° C. is as high as 0.65-1.0%. Therefore, the cellulose fibers are used as a reinforcing cord for a carcass in the run-flat tire of the side reinforcement type.

In the conventional run-flat tire of the side reinforcement type using the cellulose fiber cord of rayon or the like as the reinforcing cord for the carcass, however, since the elastic modulus of the cellulose fiber is not sufficiently high, the deflection of the tire is large in the run-flat running and also the temperature of the tire becomes higher in the run-flat running to decrease the rigidity of the carcass ply to thereby further make the deflection of the tire larger.

On the contrary, when the sidewall portion is reinforced by making the gauge of the side reinforcing rubber layer thicker or the like for prolonging the durable distance of the tire during the run-flat running, there are problems that the tire weight increases, and the longitudinal spring of the tire in the usual running rises and the ride comfort in the usual running is deteriorated.

DISCLOSURE OF THE INVENTION

It is, therefore, an object of the invention to solve the problems of the conventional techniques and to provide a run-flat tire improving the durability during the run-flat running without damaging the ride comfort in the usual running.

The inventors have made various studies in order to achieve the above object and found that by using a cord layer including polyketone fiber cords with particular thermal shrinkage stress and elastic modulus in at least a part of a region A ranging from a belt end to a maximum width part of a tire side portion and a region B ranging from a neighborhood of a bead core to a bead filler, more concretely by using the polyketone fiber cord with the particular thermal shrinkage stress and elastic modulus as a reinforcing cord for a carcass or by arranging a reinforcing cord layer made of rubberized polyketone fiber cords with the particular thermal shrinkage stress and elastic modulus in at least a part outside the carcass can be suppressed the deflection of the tire in the run-flat running without increasing the tire weight and hence the run-flat durability of the tire can be largely improved without deteriorating the ride comfort in the usual running, and as a result, the invention has been accomplished.

That is, the run-flat tire according to the invention is characterized in that a side reinforcing rubber layer having a crescent shape at section is disposed in a sidewall portion and a cord layer including a polyketone fiber cord satisfying the following conditions of the following equations (I) and (II):

$$\sigma \geq -0.01 \times E + 1.2 \quad \text{(I)}$$

$$\sigma \geq 0.02 \quad \text{(II)}$$

[wherein σ is a thermal shrinkage stress at 177° C. (cN/dtex) and E is an elastic modulus at 25° C. under a load of 49 N (cN/dtex)] is disposed in at least a part of a region A ranging from a belt end to a maximum width part of a tire side portion and a region B ranging from a neighborhood of a bead core to a bead filler.

The thermal shrinkage stress σ at 177° C. of the polyketone fiber cord used herein is a stress generated at 177° C. in the cord when a sample of the polyketone fiber cord having a fixed length of 25 cm and subjected to a usual dipping treatment prior to vulcanization is heated at a temperature rising rate of 5° C./minute, while the elastic modulus E at 25° C. under a load of 49 N of the polyketone fiber cord is an elastic modulus as a unit of cN/dtex calculated from a tangent line at 49 N in S-S curve by a tensile test of the cord according to JIS.

Preferable embodiments of the run-flat tire according to the invention are as follows.

The first preferable tire is a run-flat tire (1) comprising a pair of bead portions, a pair of sidewall portions, a tread portion continuing to both the sidewall portions, a carcass toroidally extending between the pair of bead portions to reinforce these portions and comprised of one or more carcass plies, and a pair of side reinforcing rubber layers arranged at an inside of the carcass in the side wall portions and having a crescent shape at section, characterized in that the carcass ply is formed by covering a plurality of reinforcing cords arranged in parallel to each other with a coating rubber, and the reinforcing cord is a polyketone fiber cord obtained by twisting a plurality of filament bundles of polyketone, and the polyketone fiber cord satisfies the conditions of the above equations (I) and (II).

In the run-flat tire of the item (1), the polyketone fiber cord is preferable to have a twisting coefficient (Nt) defined by the following equation (III) of not less than 0.34:

$$Nt = \tan\theta = 0.001 \times N \times (0.125 \times D/\rho)^{1/2} \quad \text{(III)}$$

[wherein N is a twisting number (turns/10 cm) and ρ is a specific gravity of cord (g/cm³) and D is a total decitex number of cord (dtex)]. At this moment, the twisting number N is a twisting number when a plurality of the above filament bundles are twisted.

In the run-flat tire of the item (1), it is preferable that the end count of the polyketone fiber cords in the carcass ply is 35-60 (cords/50 mm).

The second preferable tire is a run-flat tire (2) comprising a radial carcass toroidally extending between a pair of bead cores embedded in respective bead portions and comprised of one or more carcass plies, a tread portion disposed on an outside of a crown portion of the radial carcass in a radial direction of the tire, a pair of buttress portions located at both end parts of the tread portion, a pair of sidewall portions each connecting the buttress portion to the bead portion, and a pair of side reinforcing rubber layers each disposed inside the radial carcass in a zone from the buttress portion to the sidewall portion and having a crescent shape at section, characterized in that a reinforcing cord layer formed by covering polyketone fiber cords, each of which being obtained by twisting a plurality of filament bundles of polyketone and satisfies the conditions of the above equations (I) and (II), with a coating rubber is disposed in a region A ranging from a belt end to a maximum width part of a tire side portion or a region B ranging from a neighborhood of a bead core to a bead filler.

The third preferable tire is a run-flat tire (3) comprising a carcass comprised of one or more carcass plies and having a turnup structure wound around a bead core located at both sides in a widthwise direction and a side reinforcing rubber layer disposed in a tire sidewall portion at each side in the widthwise direction of the tire and having a crescent shape at section, characterized in that a pair of reinforcing cord layers are rendered into a rigidity equal to or more than that of the carcass and disposed so as to cover at least a part of the side reinforcing rubber layer at each side in a widthwise direction of the tire from the outside of the carcass;

the reinforcing cord layer is arranged adjacent to a portion of the carcass corresponding to a zone at least ranging from an end of a belt to a maximum width part of the tire side portion; and a cord constituting the reinforcing cord layer is a polyketone fiber cord satisfying the conditions of the above equations (I) and (II).

The fourth preferable tire is a run-flat tire (4) comprising a radial carcass toroidally extending between a pair of bead cores embedded in respective bead portions and comprised of one or more carcass plies, a tread portion disposed on an outside of a crown portion of the radial carcass in a radial direction of the tire, a pair of buttress portions located at both end part of the tread portion, a pair of sidewall portions each connecting the buttress portion to the bead portion, a pair of side reinforcing rubber layers disposed in the sidewall portions and having a crescent shape at section, a bead filler disposed at an outside of the bead core in the radial direction of the tire, and a reinforcing cord layer disposed on an outside of at least a part of the carcass, characterized in that a cord constituting the carcass ply and a cord constituting the reinforcing cord layer are polyketone fiber cords each satisfying the conditions of the above equations (I) and (II).

In the run-flat tire of the item (4), it is preferable that the reinforcing cord layer is at least a part of a region A ranging from a belt end to a maximum width part of a tire side portion and a region B ranging from a neighborhood of a bead core to a bead filler.

In the run-flat tires of the items (2), (3) and (4), it is preferable that an angle of the polyketone fiber cord in the reinforcing cord layer with respect to the radial direction of the tire is 0-85°.

In the run-flat tires of the items (2), (3) and (4), the polyketone fiber cord is preferable to have a twisting coefficient (Nt) defined by the equation (III) of not less than 0.25.

In the run-flat tires of the items (2), (3) and (4), it is preferable that an end count of the polyketone fiber cords in the reinforcing cord layer is 5-60 (cords/50 mm).

In the run-flat tires of the items (2), (3) and (4), it is preferable that the cords constituting the reinforcing cord layer disposed at the side of the tire so that an angle between a road surface and an equatorial plane of the tire becomes not more than 90° at a run-flat running state are inclined in a direction opposite to a rotating direction of the tire with respect to the radial direction and an inclination angle of the cord with respect to the radial direction of the tire is within a range of 0-20°.

In the run-flat tires of the items (2), (3) and (4), it is preferable that an end of the reinforcing cord layer has a turnup structure wound around the bear core.

In the run-flat tires of the items (2), (3) and (4), it is preferable that an angle of the polyketone fiber cord in the reinforcing cord layer with respect to the radial direction of the tire is not more than 5°.

In the run-flat tires of the items (2), (3) and (4), it is preferable that the polyketone fiber cord has an elastic modulus E at 25° C. under a load of 49N of 30-170 cN/dtex and a thermal shrinkage stress σ at 177° C. of 0.2-1.5 cN/dtex.

In the run-flat tire according to the invention, the polyketone fiber cord is preferable to be formed by twisting two or three filament bundles each of polyketone having a fineness of 500-2000 dtex.

In the run-flat tire according to the invention, the polyketone fiber cord is preferable to have a reversibility of shrinking at a high temperature and stretching in the turning to room temperature.

In the run-flat tire according to the invention, the polyketone is preferable to have substantially a repeating unit represented by the following general formula (IV):

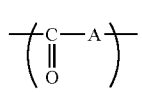

(IV)

[wherein A is a moiety derived from an unsaturated compound polymerized with unsaturated bonds, and may be same or different in each of repeating units]. Moreover, it is particularly preferable that A in the formula (IV) is ethylene group.

According to the invention, there can be provided a run-flat tire in which the durability in the run-flat running is largely improved without damaging the ride comfort in the usual running by using the polyketone fiber cord having the particular thermal shrinkage stress and elastic modulus in at least a part of a region A ranging from a belt end to a maximum width part of a tire side portion and a region B ranging from a neighborhood of a bead core to a bead filler.

BEST MODE FOR CARRYING OUT THE INVENTION

Figure 1:
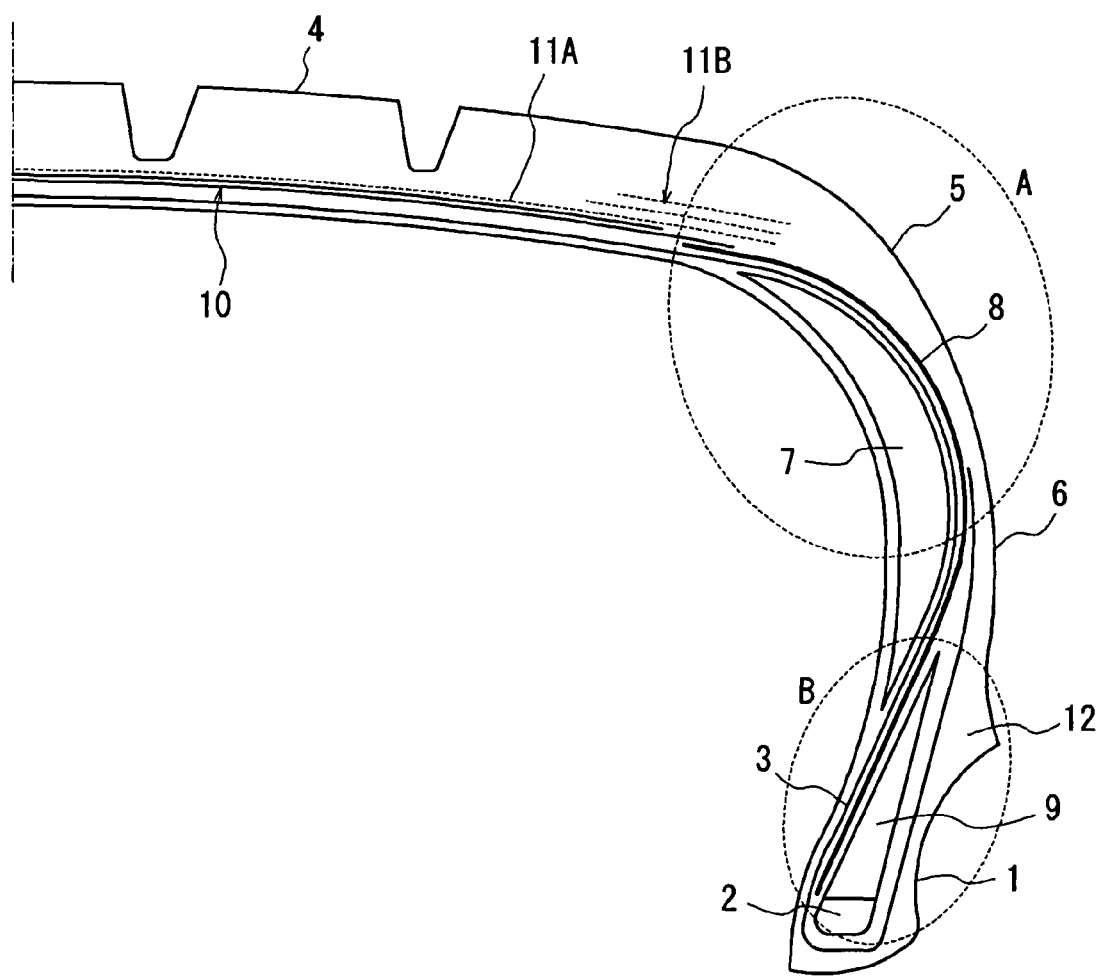
FIG. 1 is a section view of a right-half portion of an embodiment of the run-flat tire according to the invention.

The invention will be described in detail with reference to the accompanying drawings below. Each of tires shown in FIGS. 1-6 comprises a radial carcass 3 having a main body portion toroidally extending between a pair of bead cores 2 embedded in respective bead portions 1 and a turnup portion wound around the bead core 2 from an inside in a widthwise direction of the tire toward an outside and outward in a radial direction, a tread portion 4 disposed at an outside of a crown portion of the radial carcass 3 in the radial direction of the tire, a pair of buttress portions 5 located at both end parts of the tread portion 4, a pair of sidewall portions 6 connecting the buttress portions 5 to the bead portions 1, a pair of side reinforcing rubber layers 7 disposed inside the radial carcass 3 over a zone ranging from the buttress portion 5 to the sidewall portion 6 and having a crescent shape at section, a reinforcing cord layer 8 disposed outside at least a part of the radial carcass 3.

In the tires of FIGS. 1-6, a bead filler 9 is arranged between the main body portion and the turnup portion of the radial carcass 3 and outside the bead core 2 in the radial direction of the tire, and also a belt 10 comprised of two belt layers is disposed at the outside of the crown portion of the radial carcass 3 in the radial direction of the tire. Further, a belt reinforcing layer 11A is disposed outside the belt 10 in the radial direction of the tire so as to cover the whole of the belt 10, and a pair of belt reinforcing layers 11B is disposed so as to cover only both end portions of the belt reinforcing layer 11A. At this moment, the belt layer is usually a rubberized layer containing cords extending slantly with respect to the equatorial plane of the tire, preferably a rubberized steel cord layer. The two belt layers are laminated so as to cross the cords constituting the belt layers with each other with respect to the equatorial plane of the tire to constitute the belt 10. Also, each of the belt reinforcing layers 11A, 11B is usually a rubberized layer containing cords arranged substantially in parallel to a circumferential direction of the tire.

Moreover, the radial carcass 3 in the tires shown in FIGS. 1-6 and 8 is comprised of one carcass ply. The number of carcass plies constituting the radial carcass 3 is not particularly limited in the tire according to the invention and may be two or more as shown in a tire of FIG. 9. Also, the structure of the radial carcass 3 is not particularly limited, but may have a structure that the end portion of the radial carcass 3 is sandwiched between the bead cores of two layers as shown in a tire of FIG. 7, or a structure that the turnup portion is extended to an inside of the end portion of the belt 10 as shown in a tire of FIG. 10 or so-called envelop structure.

In the tires of FIGS. 1-10, the belt 10 is comprised of two belt layers, but the number of belt layers constituting the belt 10 is not limited thereto in the tire according to the invention. Further, the belt reinforcing layers 11A, 11B in the tires of FIGS. 1-10 are constructed with one belt reinforcing layer 11A covering the whole of the belt 10 and two belt reinforcing layers 11B covering only both end portions of the belt reinforcing layer 11A or have a so-called cap-layer structure. In the tire according to the invention, the arrangement of the belt reinforcing layers 11A, 11B is not essential, and the belt reinforcing layers having another structure and layer number may be arranged.

In the tires of FIGS. 1-10, a rim guard 12 having substantially a triangular shape at section is disposed outside the turnup portion of the radial carcass 3 in a zone ranging from the sidewall portion 6 to the bead portion 1 in the widthwise direction of the tire, but the arrangement of the rim guard 12 is not essential in the tire according to the invention, and a rim guard having another shape may be arranged. In the invention, the maximum width part of the tire side portion means a maximum width portion when the rim guard 12 is not existent.

Figure 2:
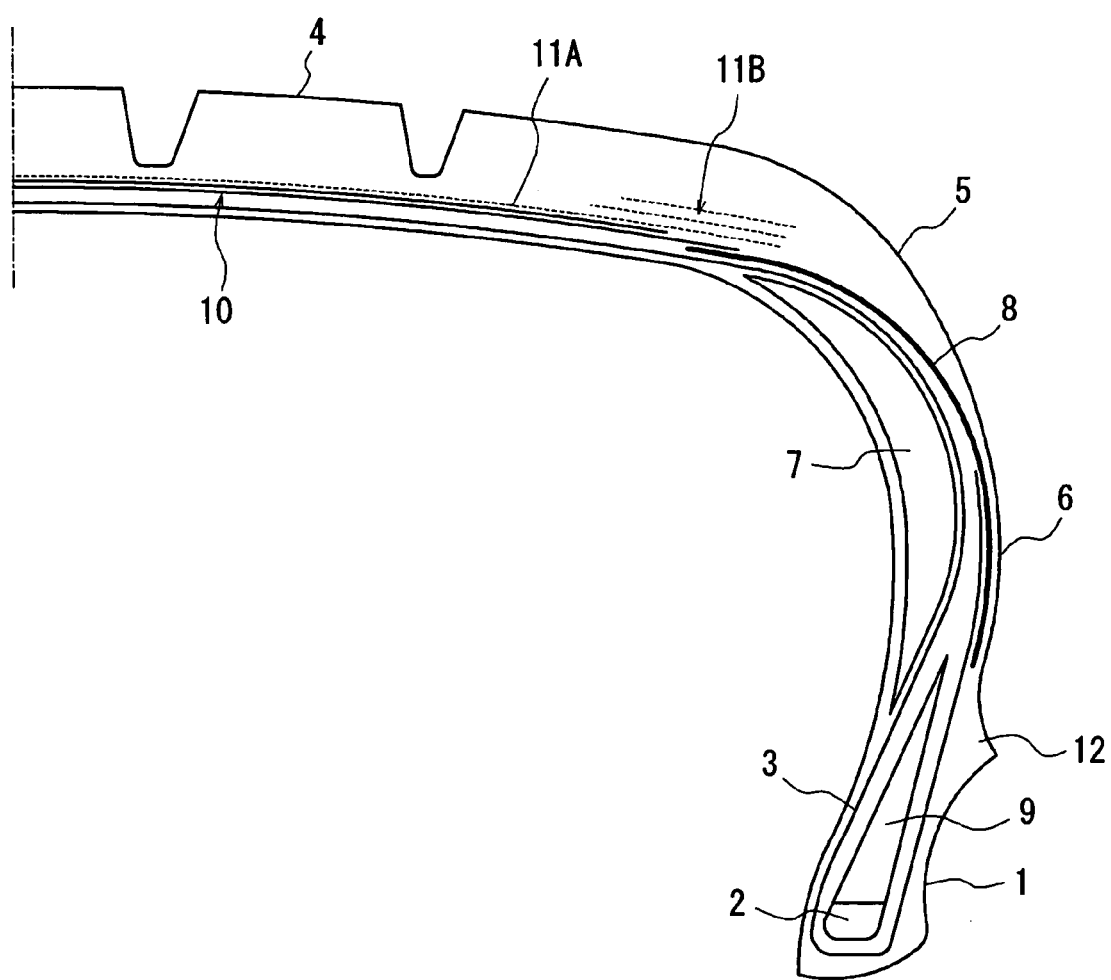
FIG. 2 is a section view of a right-half portion of another embodiment of the run-flat tire according to the invention.
Figure 3:
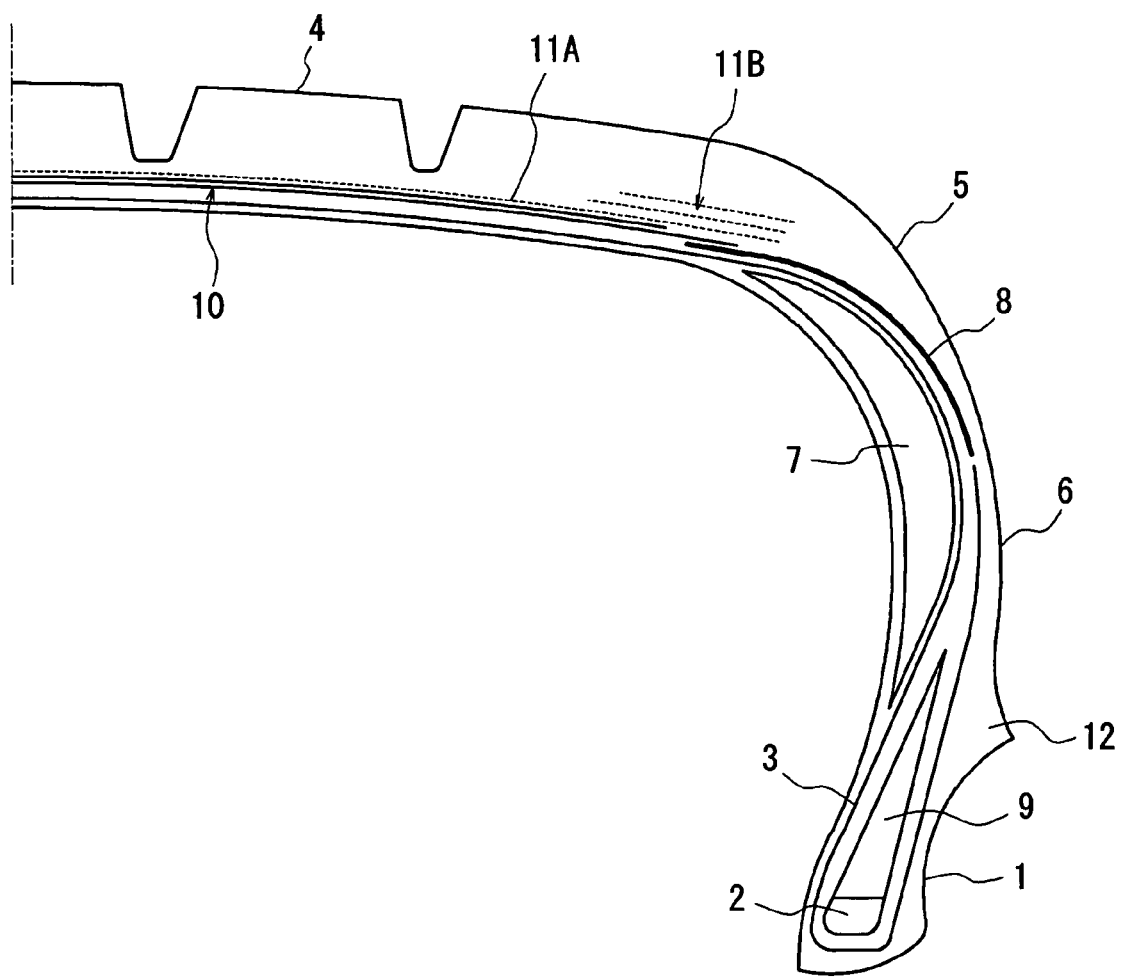
FIG. 3 is a section view of a right-half portion of the other embodiment of the run-flat tire according to the invention.
Figure 4:
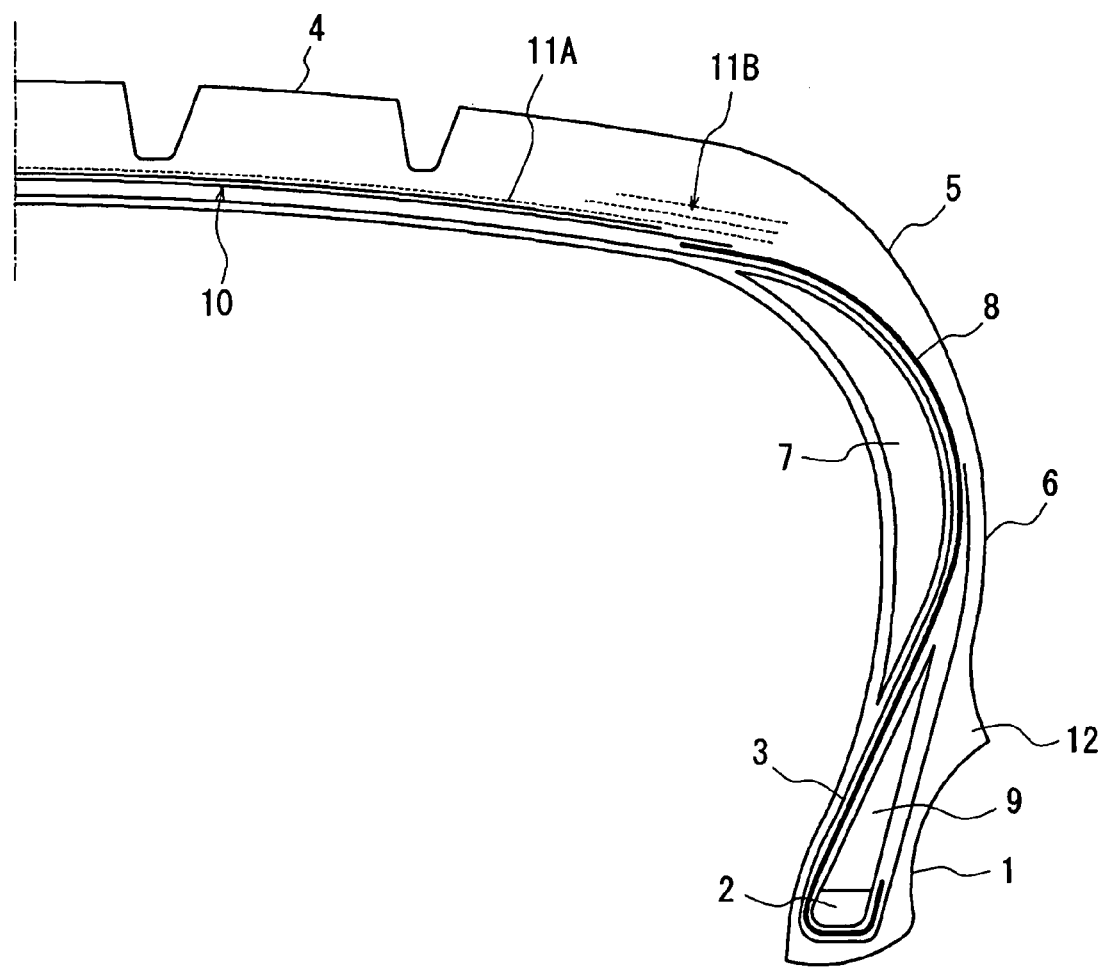
FIG. 4 is a section view of a right-half portion of a further embodiment of the run-flat tire according to the invention.
Figure 5:
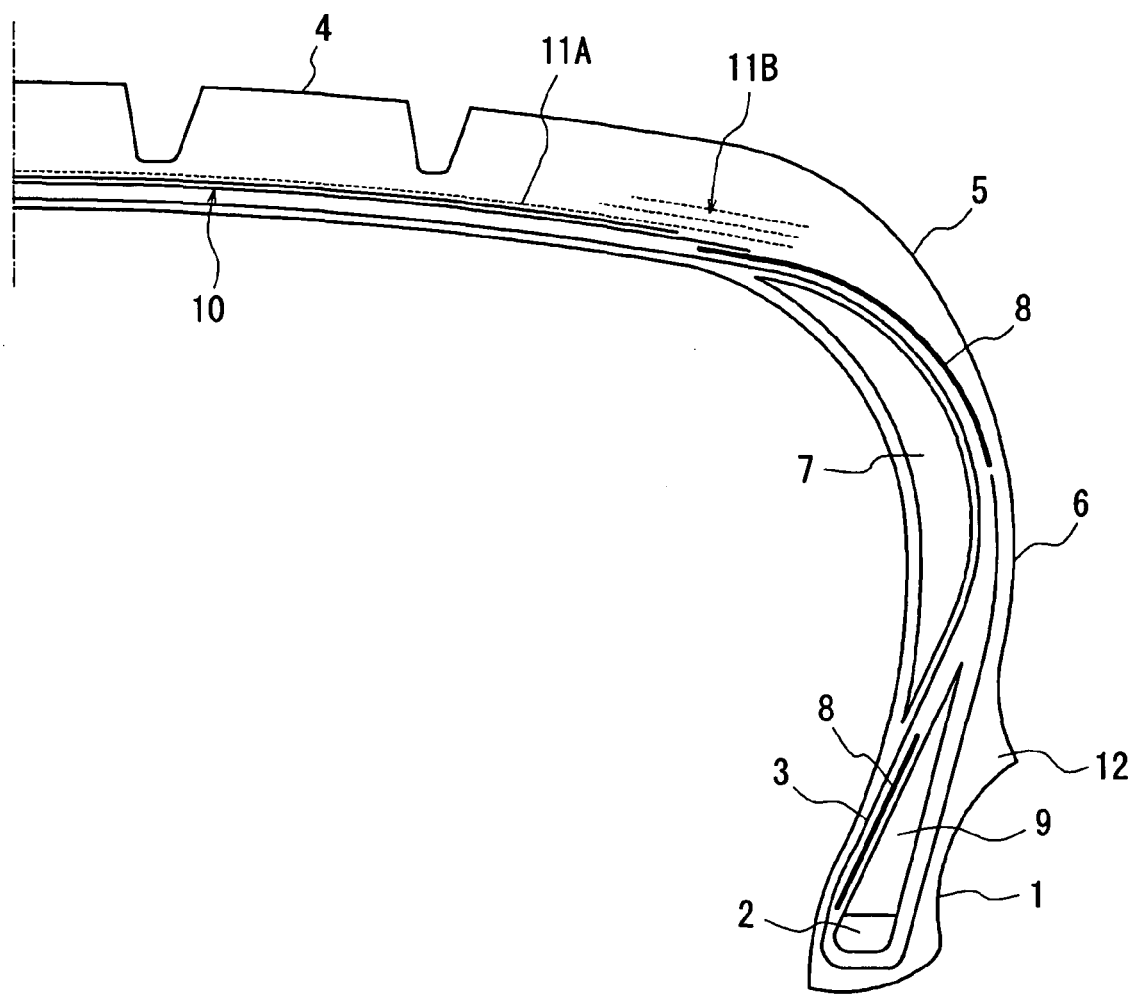
FIG. 5 is a section view of a right-half portion of another embodiment of the run-flat tire according to the invention.
Figure 6:
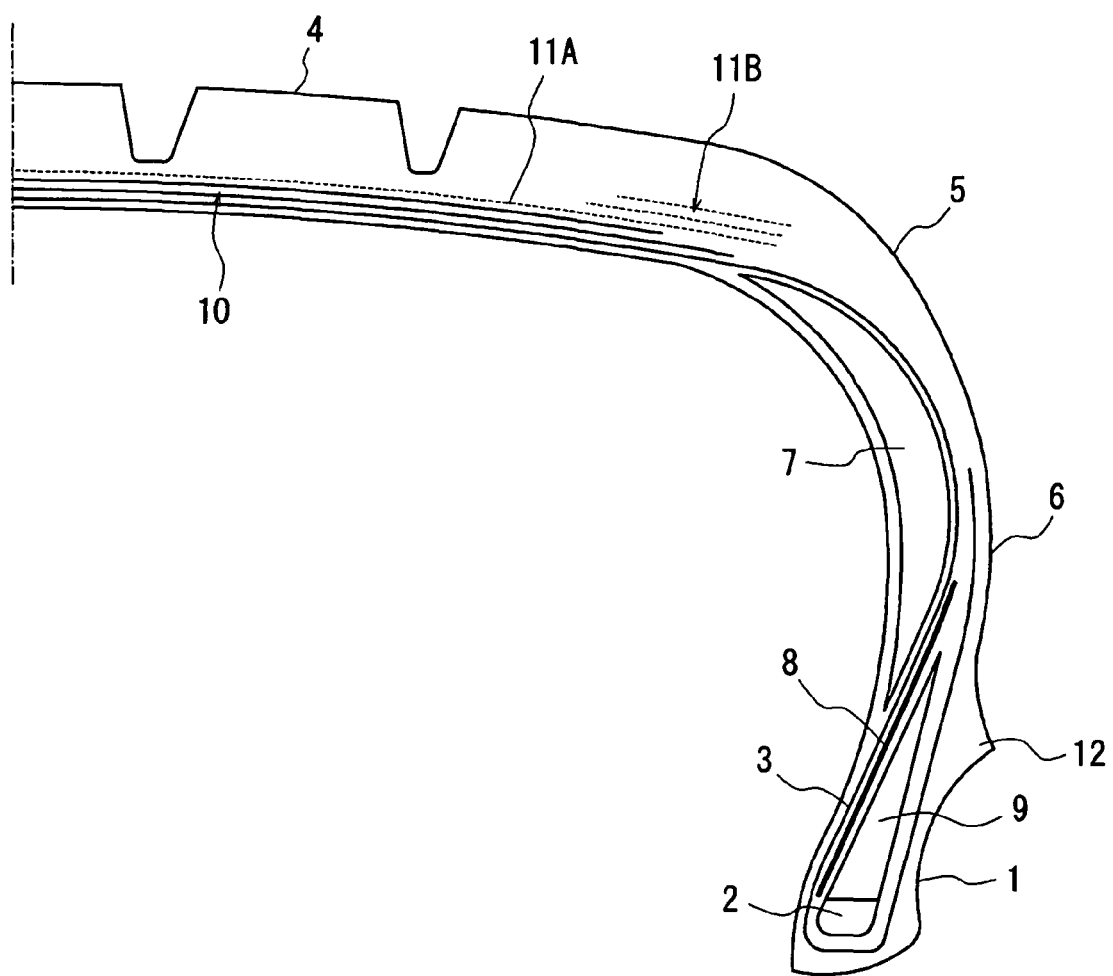
FIG. 6 is a section view of a right-half portion of the other embodiment of the run-flat tire according to the invention.
Figure 7:
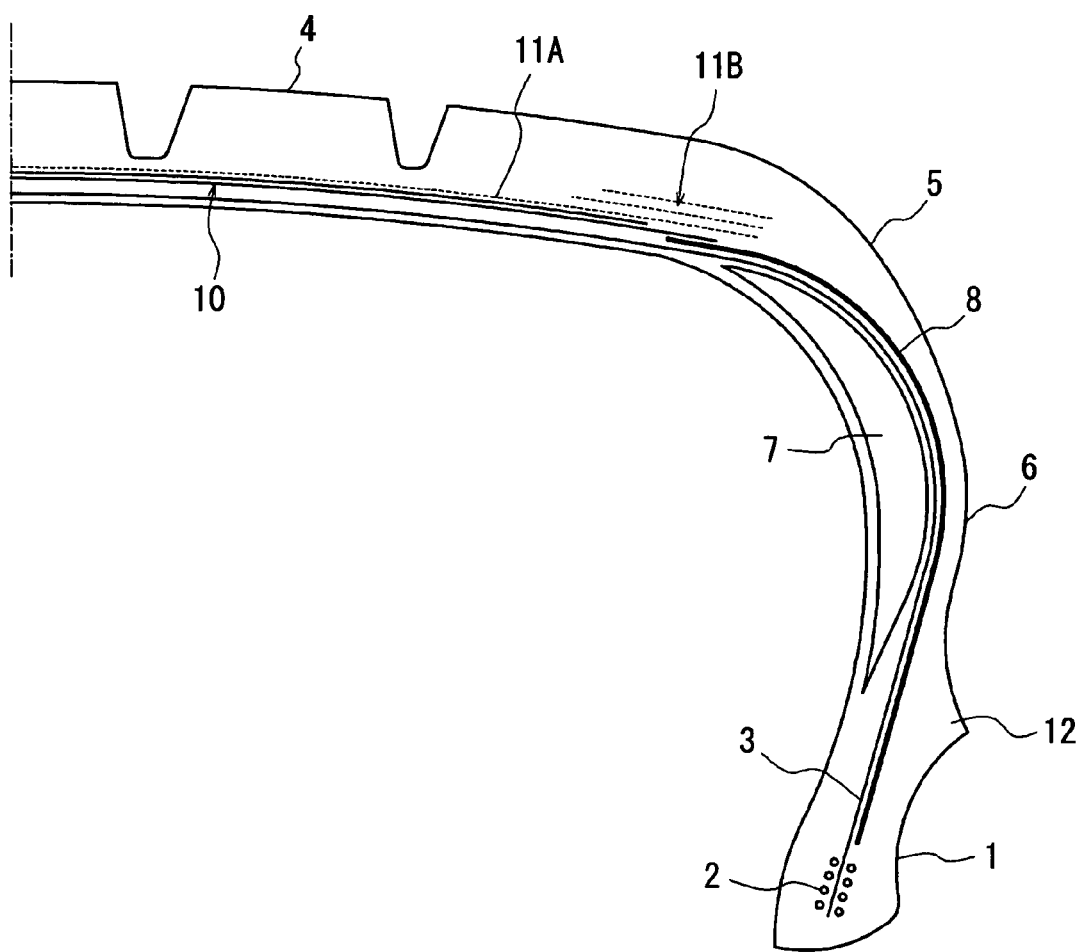
FIG. 7 is a section view of a right-half portion of a further embodiment of the run-flat tire according to the invention.
Figure 8:
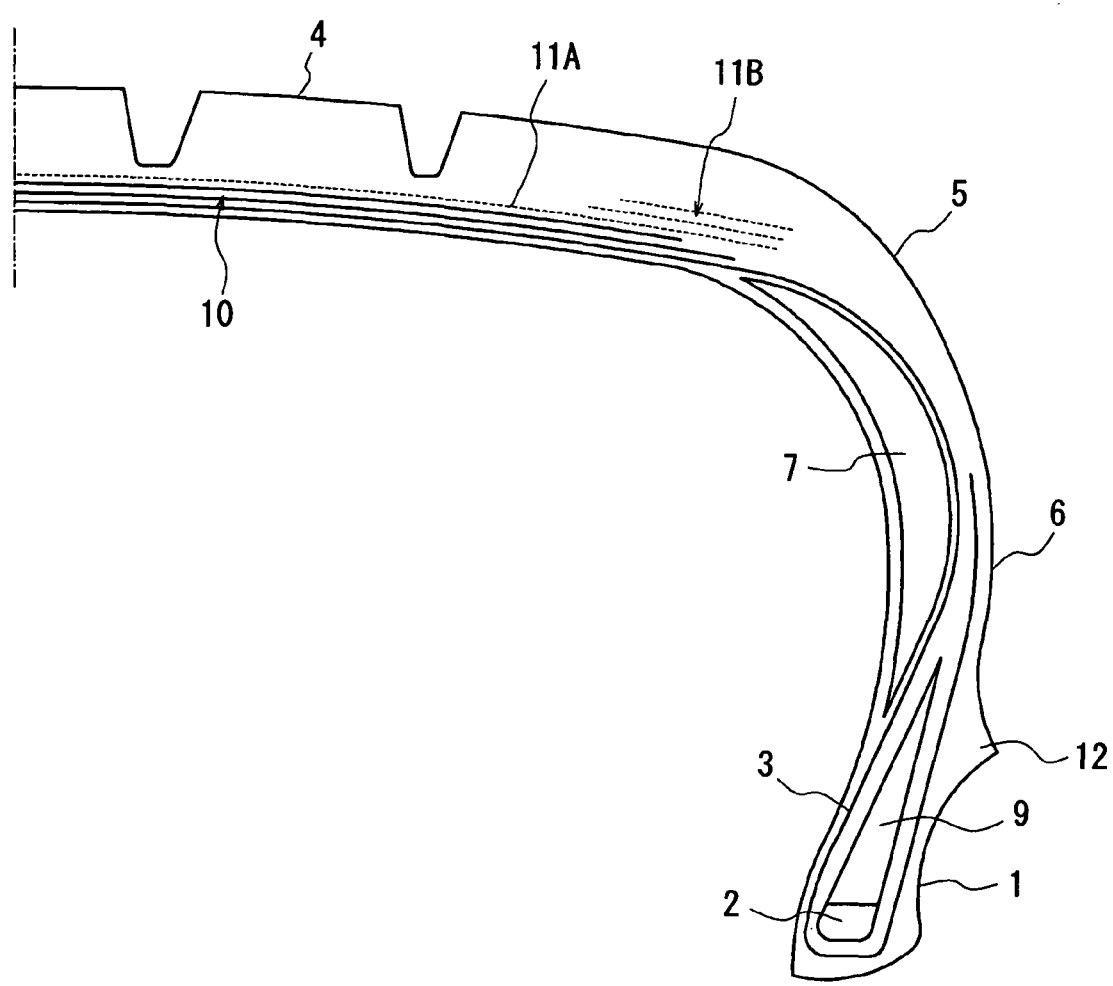
FIG. 8 is a section view of a right-half portion of another embodiment of the run-flat tire according to the invention.
Figure 9:
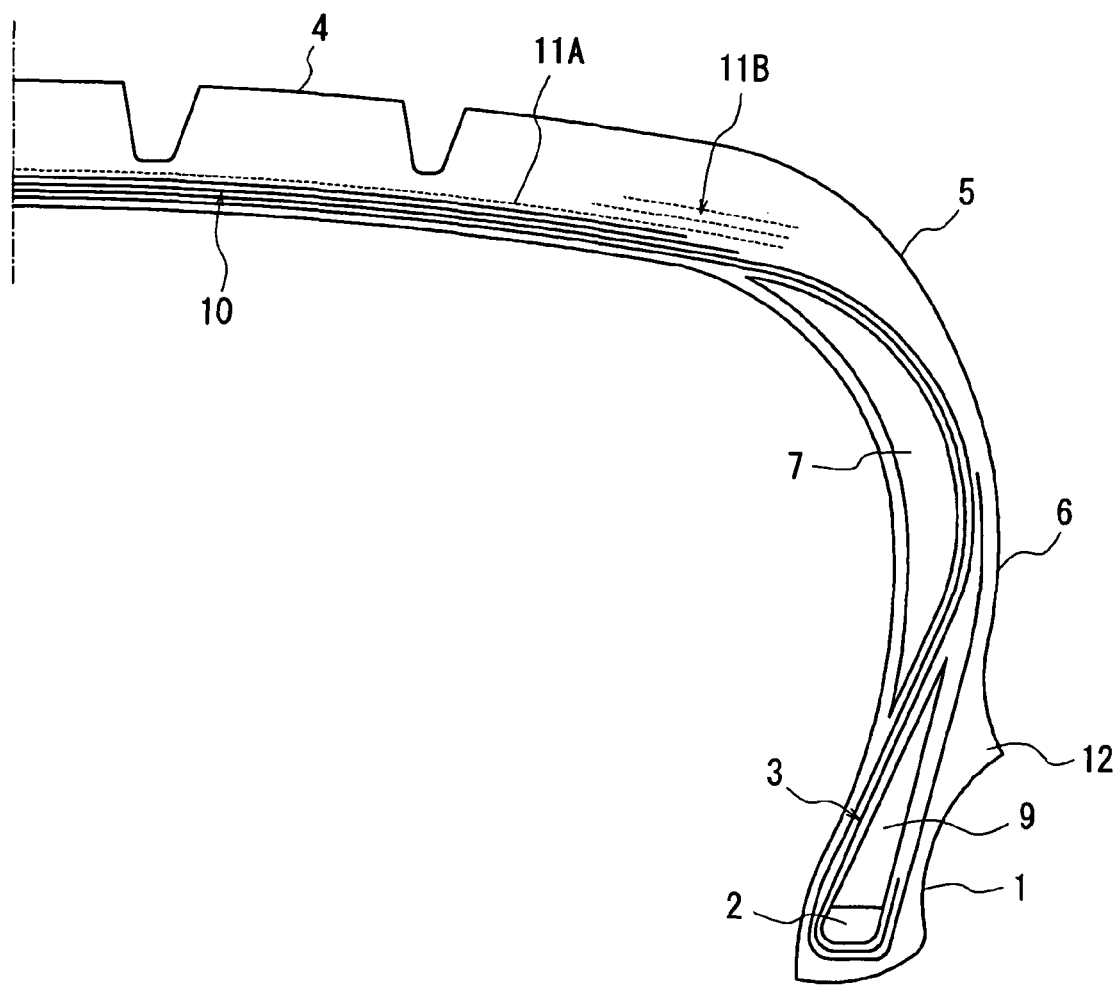
FIG. 9 is a section view of a right-half portion of the other embodiment of the run-flat tire according to the invention.
Figure 10:
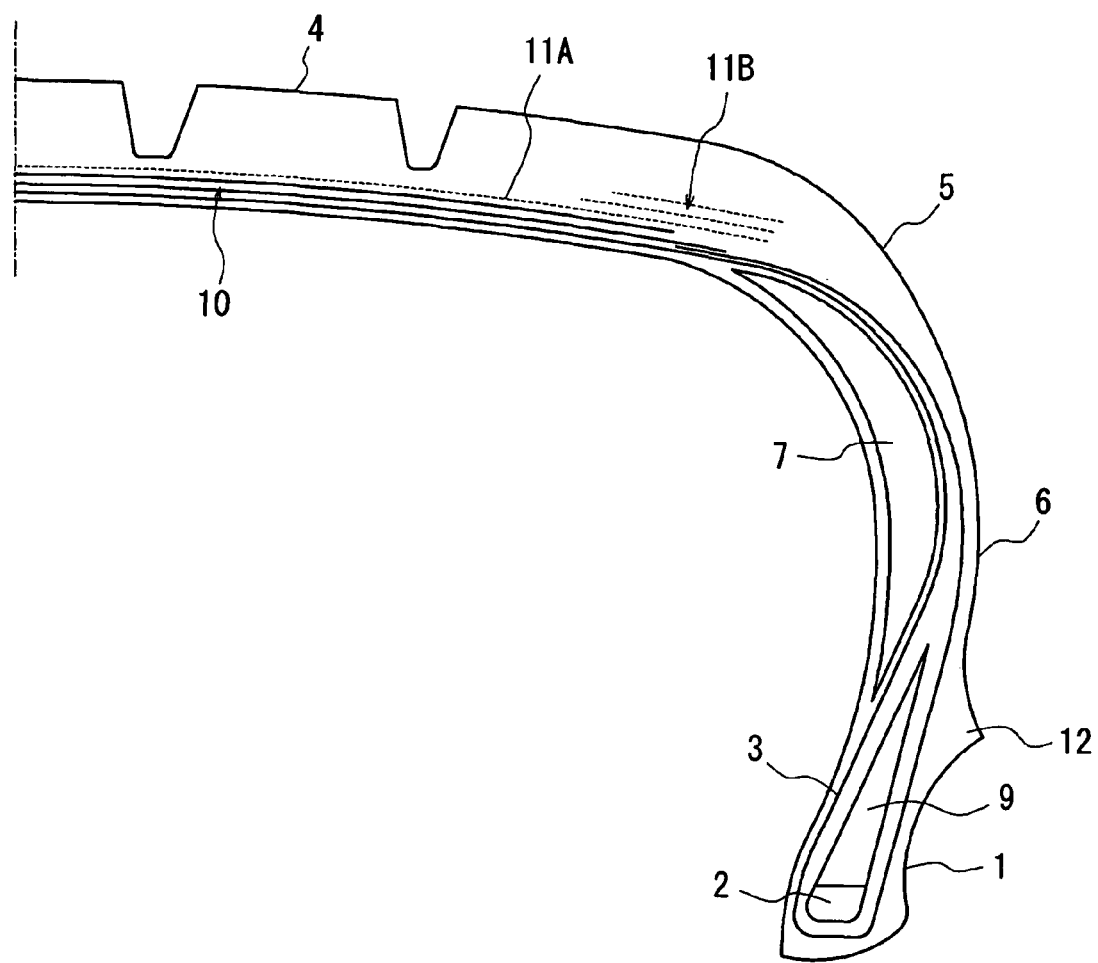
FIG. 10 is a section view of a right-half portion of a further embodiment of the run-flat tire according to the invention.

In the tires of FIGS. 1-7, a reinforcing cord layer 8 is disposed in at least a part of a region A ranging from a belt end to a maximum width part of a tire side portion and a region B ranging from a neighborhood of a bead core to a bead filler. However, the arrangement of the reinforcing cord layer 8 is not essential in the tire according to the invention. Moreover, when the reinforcing cord layer 8 is arranged in the tire according to the invention, the number of the reinforcing cord layers may be one or more. The structure of the reinforcing cord layer 8 is not particularly limited, and may take, for example, a case that the one reinforcing cord layer 8 is extended from the end portion of the belt 10 along the outside of the radial carcass 3 to the neighborhood of the bead core 2 embedded in the bead portion 1 between the main body portion of the radial carcass 3 and the bead filler 9 as shown in FIG. 1, a case that the one reinforcing cord layer 8 is disposed outside the radial carcass 3 in a zone ranging from the buttress portion 5 to the sidewall portion 6 as shown in FIG. 2, a case that the reinforcing cord layer 8 is disposed outside the radial carcass 3 in a zone ranging from the end portion of the belt 10 to the end part of the turnup portion of the carcass as shown in FIG. 3, a case that the reinforcing cord layer 8 is extended from the end portion of the belt 10 along the outside of the radial carcass 3 to the bead portion 1 between the main body portion of the radial carcass 3 and the bead filler 9 and turned and terminated around the bead core 2 embedded in the bead portion 1 as shown in FIG. 4, a case that the reinforcing cord layers 8 are arranged outside the radial carcass 3 in a zone ranging from the end portion of the belt 10 to the end part of the turnup portion of the carcass and between the main body portion of the radial carcass 3 and the bead filler 9, respectively, as shown in FIG. 5, a case that the reinforcing cord layer is arranged between the main body portion of the radial carcass 3 and the bead filler 9 as shown in FIG. 6, a case that the one reinforcing cord layer 8 is extended from the end portion of the belt 10 along the outside of the radial carcass 3 to the neighborhood of the bead core 2, and so on. Moreover, the arrangement of the reinforcing cord layer 8 is not essential in the tire according to the invention. For example, the tires having no reinforcing cord layer 8 as shown in FIGS. 8, 9 and 10 are embodiments of the invention.

In the run-flat tire according to the invention, a cord layer containing polyketone fiber cords each satisfying conditions of the following equations (I) and (II):

$$\sigma \geq -0.01 \times E + 1.2 \quad (I)$$

$$\sigma \geq 0.02 \quad (II)$$

[wherein σ is a thermal shrinkage stress at 177° C. (cN/dtex) and E is an elastic modulus at 25° C. under a load of 49N (cN/dtex) id disposed in at least a part of a region A ranging from a belt end to a maximum width part of a tire side portion and a region B ranging from a neighborhood of a bead core to a bead filler. In this case, the cord layer is not particularly limited as long as it contains the polyketone fiber cord satisfying the conditions of the equations (I) and (II), and may be, for example, the carcass 3 or the reinforcing cord layer 8.

Figure 11:
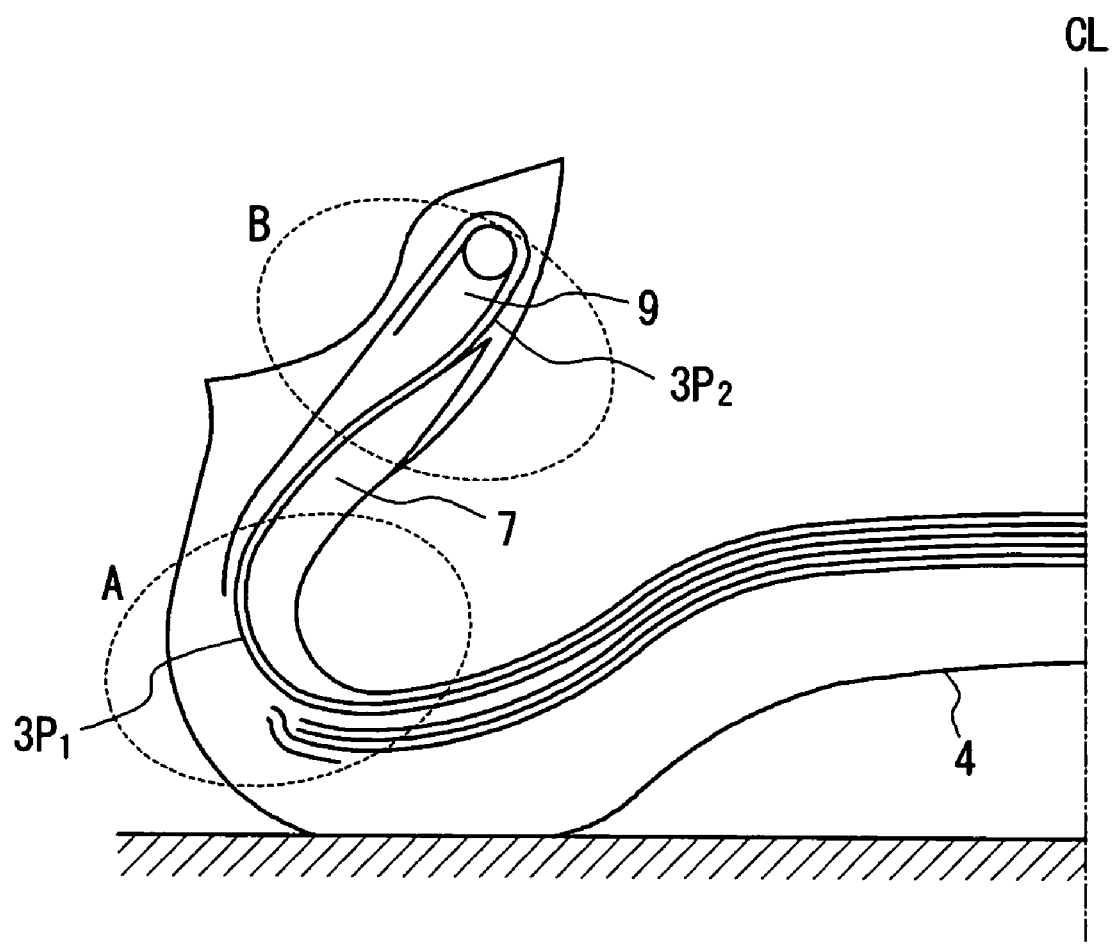
FIG. 11 is a partial section view of a run-flat tire in a run-flat running as analyzed by a computer.

As shown in FIG. 11, if the internal pressure of the run-flat tire of the side reinforcement type becomes zero, compression stress is born by the side reinforcing rubber layer 7 and tensile stress is born by the carcass 3 in the sidewall portion 6, whereby the bending rigidity is generated effectively. Similarly, compression stress is born by the bead filler 9 and tensile stress is born by the carcass 3 in the bead portion 1, whereby the bending rigidity is generated effectively. The inventors have revealed from numeral analysis through a computer that a site of applying large tensile stress to the carcass 3 in the run-flat running is a region A ranging from a belt end to a maximum width part of a tire side portion and a region B ranging from a neighborhood of a bead core to a bead filler. Therefore, when the cord layer formed by covering the polyketone fiber cords satisfying the conditions of the equations (I) and (II) with a coating rubber is arranged in at least a part of the region A ranging from a belt end to a maximum width part of a tire side portion and the region B ranging from a neighborhood of a bead core to a bead filler, it is possible to improve the durability in the run-flat running without damaging the ride comfort in the usual running of the tire.

The polyketone fiber cord is large in the thermal shrinkage stress at a high temperature, so that a high rigidity is developed from a time that the initial stress of the tire is relatively small in such a run-flat running that the temperature of the tire becomes high, whereby the bending rigidity of the sidewall portion in the radial direction of the tire is increased to suppress the deflection of the tire and hence the run-flat durability of the tire can be improved. On the other hand, the polyketone fiber cord is low in the rigidity when the strain of the tire in the stretching direction of the cord is small in the usual running, so that there is not caused the rise of the longitudinal spring of the tire in the usual running and the ride comfort of the tire is not deteriorated.

In the invention, the equation (I) is derived as follows. As a force of supporting the tire in the run-flat running are existent a drag F1 passively developed by the sidewall portion against an input from exterior (for example, load and strain) and a drag F2 actively developed by the sidewall portion due to a heat generation. That is, a sum of F1 and F2 is required to be over a certain level in order to effectively support the tire in the run-flat running. When contributing ratios of F1 and F2 are respectively α and β (wherein α>0 and β>0), there is derived the following equation:

$$\alpha \times F1 + \beta \times F2 > \gamma$$

(wherein γ is a standard value based on a tire size or a speed and γ>0). In this case, a mainly dominant factor of F1 includes a stiffness EC of the cord in the carcass ply or the reinforcing cord layer, while a mainly dominant factor of F2 includes a thermal shrinkage stress HF of the cord in the carcass ply or the reinforcing cord layer. By substituting EC as F1 and HF as F2 for the above equation is derived the following equation:

$$HF > -\alpha/\beta \times EC + \gamma/\beta$$

When the thermal shrinkage stress σ at 177° C. of the cord is used as HF and the elastic modulus E at 25° C. under a load of 49 N of the cord is used as EC, the thermal shrinkage stress σ is required to be in an upper domain of gradient (−α/β)× elastic modulus E+intercept (γ/β). The inventors have studied and discovered that when the gradient (−α/β) is −0.01 and the intercept (γ/β) is 1.2, or when the thermal shrinkage stress σ and the elastic modulus E satisfy the relationship of the equation (I), the tire in the run-flat running can be effectively supported.

Moreover, when the cord used does not satisfy the relationship of the equation (I), as a cord having a large thermal shrinkage stress σ but a low elastic modulus E is used, the deflection of the tire in the run-flat running can not be suppressed sufficiently and the run-flat durability of the tire is deteriorated, while as a cord having a high elastic modulus E but a small thermal shrinkage stress σ is used, the longitudinal spring of the tire in the usual running becomes large and the ride comfort of the tire in the usual running is deteriorated. Also, when the thermal shrinkage stress σ at 177° C. of the cord used is less than 0.02 cN/dtex, the deflection quantity in the run-flat running becomes large and the run-flat durable distance is lacking.

The polyketone fiber cord is preferable to have a thermal shrinkage stress σ at 177° C. of not more than 1.5 cN/dtex. When the thermal shrinkage stress σ at 177° C. of the polyketone fiber cord exceeds 1.5 cN/dtex, the shrinkage force during the vulcanization becomes excessively large, and as a result, the cord disorder and rubber disarray inside the tire are caused to bring about the deteriorations of the durability and uniformity. Also, the polyketone fiber cord more preferably has a thermal shrinkage stress σ at 177° C. of not less than 0.20 cN/dtex from a viewpoint that the tire deformation is sufficiently suppressed in the run-flat running, more preferably a thermal shrinkage stress σ at 177° C. of not less than 0.30 cN/dtex, further preferably more than 0.4 cN/dtex from a viewpoint that the tire deformation is surely suppressed in the run-flat running. Moreover, the polyketone fiber cord preferably has an elastic modulus E at 25° C. under a load of 49 N of not less than 30 cN/dtex from a viewpoint that the tire deformation in the run-flat running is suppressed sufficiently, more preferably an elastic modulus E under a load of 49N of not less than 80 cN/dtex from a viewpoint that the tire deformation in the run-flat running is suppressed surely. Furthermore, the polyketone fiber cord has preferably an elastic modulus E at 25° C. under a load of 49N of not more than 170 cN/dtex from a viewpoint that the fatigue resistance is ensured sufficiently, more preferably an elastic modulus E under a load of 49N of not more than 150 cN/dtex from a viewpoint that the fatigue resistance is made better.

The polyketone fiber is preferable to be formed by twisting two or three filament bundles of polyketone having a fineness of 500-2000 dtex. When the fineness of the filament bundle used in the polyketone fiber cord is less than 500 dtex, the elastic modulus and thermal shrinkage stress are insufficient, while when it exceeds 2000 dtex, the diameter of the cord becomes thick and the end count can not be made dense. Moreover, even if the number of the filament bundles of polyketone is 4 or more, as long as the relationship of the equations (I) and (II) is satisfied, the number of the filament bundles is not particularly limited.

The polyketone fiber cord is preferable to have a reversibility of shrinking at a high temperature and stretching in the turning to room temperature. In this case, the polyketone fiber cords in the cord layer (e.g. the carcass ply or the reinforcing cord layer 8) shrink to enhance the rigidity at an elevated temperature or in the run-flat running, and hence the deflection of the sidewall portion in the tire can be suppressed, while the polyketone fiber cords in the cord layer stretch at low temperature or in the usual running to lower the rigidity and the longitudinal spring of the tire, and hence the deterioration of the ride comfort of the tire in the usual running can be suppressed. Also, by using the reversible polyketone fiber cord having a difference between the thermal shrinkage stresses at 20° C. and 177° C. of not less than 0.20 cN/dtex, preferably not less than 0.25 cN/dtex, the effects during the usual running and run-flat running can be simultaneously established.

The twisting structure of the polyketone fiber cord is not particularly limited, and as the polyketone cord may be used, for example, ones obtained by twisting a plurality of filament bundles of polyketone, or ones obtained by twisting one filament bundle of polyketone. As a polyketone being a raw material of the polyketone fiber cord is preferable a polyketone substantially having a repeating unit represented by the formula (IV). Among the polyketones, a polyketone wherein not less than 97 mol % of the repeating unit is 1-oxotrimethylene [—$CH_2$—$CH_2$—CO—] is preferable, a polyketone wherein not less than 99 mol % is 1-oxotrimethylene is more preferable, and a polyketone wherein 100 mol % is 1-oxotrimethylene is most preferable.

In the polyketone as the raw material of the polyketone fiber cord, ketone groups may be partly bonded with each other or moieties derived from the unsaturated compound may be bonded with each other, but it is preferable that a ratio of alternate arrangement of the moiety derived from the unsaturated compound and the ketone group is not less than 90% by mass, more preferably not less than 97% by mass, most preferably 100% by mass.

The unsaturated compound forming A in the formula (IV) is most preferably ethylene, and may be an unsaturated hydrocarbon other than ethylene such as propylene, butene, pentene, cyclopentene, hexene, cyclohexene, heptene, octene, nonene, decene, dodecene, styrene, acetylene, allene or the like; a compound containing an unsaturated bond such as methyl acrylate, methyl metacrylate, vinyl acetate, acrylamide, hydroxyethyl metacrylate, undecenic acid, undecenol, 6-chlorohexene, N-vinylpyrolidone, diethylester of sulnylphosphonic acid, sodium styrenesulfonate, sodium allylsulfonate, vinylpyrolidone, vinyl chloride or the like; and so on.

As the polymerization degree of the polyketone, it is preferable that a limit viscosity ($\eta$) defined by the following formula:

$$[\eta] = \lim_{C \to 0} \frac{(T-t)}{(t \cdot C)}$$

[wherein t is a passing time of hexafluoroisopropanol having a purity of not less than 98% at 25° C. through a viscosity tube, and T is a passing time of a diluted solution of polyketone dissolved in hexafluoroisopropanol at 25° C. through the viscosity tube; and C is a mass (g) of a solute in 100 mL of the diluted solution] is within a range of 1 to 20 dL/g, more preferably 2 to 10 dL/g, even more preferably 3 to 8 dL/g. When the limit viscosity is less than 1 dL/g, the molecular weight is too small and it is difficult to obtain a high-strength polyketone fiber cord, but also troubles such as napping, breaking and the like are frequently caused in the steps of spinning, drying and drawing. While, when the limit viscosity exceeds 20 dL/g, the synthesis of the polymer takes great time and cost, but also it is difficult to uniformly dissolve the polymer, which may badly affect the spinability and properties.

As a method for forming polyketone fiber are preferable (i) a method comprising the steps of spinning an undrawn fiber and subjecting to a multi-stage heat drawing in which a final drawing at the multi-stage heat drawing step is carried out at specified temperature and draft ratio, and (ii) a method comprising the steps of spinning an undrawn fiber, subjecting to heat drawing and then quenching under a high tension. By forming the polyketone fiber through the method (i) or (ii), desirable filaments suitable for the production of the polyketone fiber cord can be obtained.

The method for spinning the undrawn polyketone fiber is not particularly limited, but may adopt the conventionally known methods. Concretely, there are mentioned a wet spinning method using an organic solvent such as hexafluoroisopropanol, m-cresol or the like as disclosed in JP-A-H02-112413, JP-A-H04-228613 and JP-A-H04-505344, and a wet spinning method using an aqueous solution of zinc salt, calcium salt, thiocyanate, iron salt or the like as disclosed in WO99/18143, WO00/09611, JP-A-2001-164422, JP-A-2004-218189 and JP-A-2004-285221. Among them, the wet spinning method using the aqueous solution of the salt is preferable.

In the wet spinning method using the organic solvent, a polyketone polymer is dissolved in hexafluoroisopropanol, m-cresol or the like at a concentration of 0.25 to 20% by mass and extruded through a spinning nozzle to from a fiber and then the solvent is removed in a non-solvent bath of toluene, ethanol, isopropanol, n-hexane, isooctane, acetone, methyl ethyl ketone or the like, whereby the undrawn polyketone fiber can be obtained after the washing.

In the wet spinning method using the aqueous solution, the polyketone polymer is dissolved in an aqueous solution of zinc salt, calcium salt, thiocyanate, iron salt or the like at a concentration of 2 to 30% by mass and extruded from a spinning nozzle into a coagulation bath at 50 to 130° C. to conduct gel spinning and then desalted and dried to obtain the undrawn polyketone fiber. In the aqueous solution dissolving the polyketone polymer, it is preferable to use a mixture of a zinc halide and a halide of an alkali metal or an alkaline earth metal. In the coagulation bath can be used water, an aqueous solution of a metal salt, or an organic solvent such as acetone, methanol or the like.

As the method for drawing the undrawn fiber is preferable a heat drawing method wherein the undrawn fiber is drawn by heating to a temperature higher than the glass transition temperature of the undrawn fiber. Moreover, the drawing of the undrawn fiber in the above method (ii) may be carried out at one stage, but it is preferable to conduct the multi-stage drawing. The heat drawing method is not particularly limited, and may adopt a method of running the fiber on, for example, a heat roll or a heat plate, and so on. At this moment, the heat drawing temperature is preferably within a range of 110° C. to (a melting point of polyketone), and the total drawing ratio is preferably not less than 10 times.

When the formation of the polyketone fiber is carried out through the method (i), the temperature at the final drawing step of the multi-stage drawing is preferable to be within a range of 110° C. to (drawing temperature at drawing step just before the final drawing step −3° C.), and the drawing ratio at the final drawing step is preferable to be within a range of 1.01 to 1.5 times. On the other hand, when the formation of the polyketone fiber is carried out through the method (ii), the tension applied to the fiber after the heat drawing is preferable to be within a range of 0.5 to 4 cN/dtex, and the cooling rate in the quenching is preferable to be not less than 30° C./second, and the cooling-end temperature in the quenching is preferable to be not higher than 50° C. The quenching method of the heat-drawn polyketone fiber is not particularly limited, and may adopt the conventionally known methods. Concretely, the cooling method using the roll is preferable. Moreover, the thus obtained polyketone fiber is large in the retention of elastic strain, so that it is preferable that the fiber is usually subjected to a relaxation heat treatment so as to make the fiber length shorter than the fiber length after the heat drawing. At this moment, the temperature of the relaxation heat treatment is preferable to be within a range of 50 to 100° C. and the relaxation ratio is preferable to be within a range of 0.980 to 0.999.

The production method of the polyketone fiber cord is not particularly limited. When the polyketone fiber cord is a structure formed by twisting two filament bundles of polyketone or a twin strand structure, it can be obtained as a twisted cord, for example, by ply-twisting the filament bundles of polyketone, combining two bundles and then cable-twisting them in an opposite direction. On the other hand, when the polyketone fiber cord is a structure formed by twisting one filament bundle of polyketone or a single strand structure, it can be obtained as a twisted cord, for example, by aligning and twisting the filament bundle of polyketone in one direction.

The polyketone fiber cords thus obtained are rubberized to obtain a cord/rubber composite used in the belt reinforcing layers 6A, 6B. The coating rubber for the polyketone fiber cord is not particularly limited, and a coating rubber used in the conventional belt reinforcing layer can be used. Moreover, the polyketone fiber cord may be treated with an adhesive to improve adhesiveness with the coating rubber before the rubberization of the polyketone fiber cords.

The first preferable tire of the invention (1) comprises a pair of bead portions 1, a pair of sidewall portions 6, a tread portion 4 continuing to both the sidewall portions 6, a carcass 3 toroidally extending between the pair of bead portions 1 to reinforce these portions and comprised of one or more carcass plies, and a pair of side reinforcing rubber layers 7 each disposed inside the carcass 3 in the sidewall portion 6 and having a crescent shape at section, characterized in that the carcass ply is formed by covering plural reinforcing cords arranged in parallel to each other with a coating rubber, and the reinforcing cord is a polyketone fiber cord obtained by twisting a plurality of filament bundles of polyketone, and the polyketone fiber cord satisfies the conditions of the equations (I) and (II). The polyketone fiber cord can suppress the deterioration of the ride comfort of the tire because the weight is equal to that of cellulose fiber cord such as rayon or the like used in the conventional carcass and the tire weight is not increased.

The polyketone fiber cord used in the carcass ply of the tire (1) is preferable to have a twisting coefficient (Nt) defined by the following equation (III) of not less than 0.34:

$$Nt = \tan\theta = 0.001 \times N \times (0.125 \times D/\rho)^{1/2} \quad \text{(III)}$$

[wherein N is a twisting number (turns/10 cm) and ρ is a specific gravity of cord (g/cm$^3$) and D is a total decitex number of cord (dtex)]. When the twisting coefficient (Nt) of the polyketone fiber cord is less than 0.34, the fatigue property is considerably deteriorated and the durability is lacking.

In the carcass ply of the tire (1), it is preferable that the end count of the polyketone fiber cords is within a range of 35-60 (cords/50 mm). When the end count of the polyketone fiber cords in the carcass ply is less than 35 (cords/50 mm), the carcass strength is lacking and the durability is lacking. Moreover, even if the end count exceeds 60 (cords/50 mm), it is not particularly limited as long as the counting is possible.

The second preferable tire of the invention (2) comprises a radial carcass 3 toroidally extending between a pair of bead cores 2 embedded in respective bead portions 1 and comprised of one or more carcass plies, a tread portion 4 disposed on an outside of a crown portion of the radial carcass 3 in a radial direction of the tire, a pair of buttress portions 5 located at both end parts of the tread portion 4, a pair of sidewall portions 6 each connecting the buttress portion 5 to the bead portion 1, and a pair of side reinforcing rubber layers 7 disposed inside the radial carcass 3 in a zone ranging from the buttress portion 5 to the sidewall portion 6 and having a crescent shape at section, characterized in that a reinforcing cord layer 8 formed by covering polyketone fiber cords, each of which being obtained by twisting a plurality of filament bundles of polyketone and satisfies the conditions of the equations (I) and (II), with a coating rubber is disposed in a region A ranging from a belt end to a maximum width part of a tire side portion or a region B ranging from a neighborhood of a bead core to a bead filler. Since a site of applying large tensile stress to the carcass 3 in the run-flat running is the region A ranging from a belt end to a maximum width part of a tire side portion and the region B ranging from a neighborhood of a bead core to a bead filler as previously mentioned, when the reinforcing cord layer 8 using the polyketone fiber cords is arranged in the region A and/or the region B, the tensile stress to the carcass 3 is effectively born by the reinforcing cord layer 8, whereby it is possible to improve the run-flat durability.

The third preferable tire of the invention (3) comprises a carcass 3 comprised of one or more carcass plies and having a turnup structure wound around a bead core 2 located at both sides in a widthwise direction and a side reinforcing rubber layer 7 disposed in a tire sidewall portion at each side in the widthwise direction of the tire and having a crescent shape at section, characterized in that a pair of reinforcing cord layers 8 are rendered into a rigidity equal to or more than that of the carcass 3 and disposed so as to cover at least a part of the side reinforcing rubber layer 7 at each side in a widthwise direction of the tire from the outside of the carcass 3, and the reinforcing cord layer 8 is arranged adjacent to a portion of the carcass corresponding to a zone at least ranging from an end of a belt to a maximum width part of the tire side portion 6, and a cord constituting the reinforcing cord layer 8 is a polyketone fiber cord satisfying the conditions of the above equations (I) and (II).

The inventors have analyzed the tension of the carcass in the conventional run-flat tire when the internal pressure is zero by a computer simulation in detail and revealed that as shown in FIG. 11, a greatest quantity of the tension is supported at a portion $3P_1$ of the carcass outside the side reinforcing rubber layer 7 in the tire and a portion $3P_2$ of the carcass inside the bead filler 9 in the tire. Therefore, the load in the run-flat running can be supported most effectively by subsidiarily adding the reinforcing cord layer 8 in the form adjacent to the portion of the carcass ranging from the outside of the side reinforcing rubber layer 7 to the inside of the bead filler 9 in the tire. On the other hand, if the reinforcing cord layer is arranged in a position come free from the above line, the longitudinal spring in the usual internal pressure is deteriorated to deteriorate the ride comfort.

As to the bending applied to the tire in the run-flat running, the high effect is obtained by increasing the rigidity at an outermost layer for bending. Since the side reinforcing rubber layer mainly supports the load, the position of the reinforcing cord layer 8 adjacent to the carcass 3 is most effective to be arranged outside the carcass 3 adjacent to the side reinforcing rubber layer 7. Particularly, when the reinforcing cord layer 8 having a rigidity higher than that of the carcass 3 is applied, the arrangement as an outermost layer further enhances the effect.

On the other hand, the rubber portion disposed between the side reinforcing rubber layer 7 and the carcass 3 adjacent to the side reinforcing rubber layer is a site between the carcass 3 subjected to tensile force and the side reinforcing rubber layer 7 subjected to compression force from a viewpoint of tire breakage, so that it is confirmed to cause a considerably large shear deformation as compared with the surround thereof. Also, the insertion between the side reinforcing rubber layer 7 and the carcass 3 frequently induces the separation failure or causes the breakage, so that it is not favorable. Particularly, when the reinforcing cord layer having a certain angle with respect to the radial direction is inserted, the breakage such as separation or the like is frequently caused before the development of the durability inherent thereto.

As to the support of the lateral force in the run-flat running, it is known to increase the ply number of the carcass 3, for example from one ply to two pliers, from 2 plies to 3 plies or the like, which has a demerit that the weight becomes heavy. Now, the inventors have analyzed the tension of the carcass at a state of adding a lateral deformation at an internal pressure of zero through a computer simulation and confirmed that the support of the load is large in the portion of the carcass ranging from the outside of the side reinforcing rubber layer 7 to the inside of the bead filler 9 likewise the case of supporting the longitudinal spring. Therefore, the lateral rigidity in the run-flat running can be ensured efficiently by adding the reinforcing cord layer 8 in the form adjacent to the portion of the carcass ranging from the outside of the side reinforcing rubber layer 7 to the inside of the bead filler 9 rather than the increase of the ply number in the carcass 3.

The inventors have made further experiments based on the above examination and found that the tire (3) is preferable. In the tire (3), the reinforcing cord layer 8 is arranged outside the carcass 3, but is not arranged between the carcass 3 and the side reinforcing rubber layer 7. Therefore, even when the reinforcing cord layer 8 is arranged, the deterioration of the run-flat durability can be avoided and the large rise of the longitudinal spring exerting on the ride comfort can be suppressed.

The fourth preferable tire of the invention (4) comprises a radial carcass 3 toroidally extending between a pair of bead cores 2 embedded in respective bead portions 1 and comprised of one or more carcass plies, a tread portion 4 disposed on an outside of a crown portion of the radial carcass 3 in a radial direction of the tire, a pair of buttress portions 5 located at both end part of the tread portion 4, a pair of sidewall portions 6 each connecting the buttress portion 5 to the bead portion 1, a pair of side reinforcing rubber layers 7 disposed in the sidewall portions 6 and having a crescent shape at section, a bead filler 9 disposed at an outside of the bead core 2 in the radial direction of the tire, and a reinforcing cord layer 8 disposed on an outside of at least a part of the carcass 3, characterized in that a cord constituting the carcass ply and a cord constituting the reinforcing cord layer are polyketone fiber cords each satisfying the conditions of the above equations (I) and (II).

As mentioned above, when the run-flat tire of the side reinforcement type is rendered into an internal pressure of zero, it is known that the bending rigidity is effectively developed in the sidewall portion 6 by supporting compression stress with the side reinforcing rubber layer 7 and tensile stress with the carcass 3. Similarly, it is known that the bending rigidity is effectively developed in the bead portion 1 by supporting compression stress with the bead filler 9 and tensile stress with the carcass 3. However, rubber modulus lowers due to the rise of the temperature based on the interior heat generation in the run-flat running, so that when the run-flat running is continued even under a constant load, the deflection of the tire becomes gradually large to finally cause the rubber breakage. On the contrary, when the polyketone fiber cord is used as a reinforcing cord for the carcass 3, the carcass ply is shrunk due to the rise of the temperature accompanied with the run-flat running to develop a high thermal shrinkage stress, and hence the bending rigidity in a direction withstanding to the deflection of the tire is added at a higher temperature to largely delay the proceeding of the tire deflection, whereby the run-flat durability can be improved.

In order to pull out the effect by the application of the polyketone fiber cord at maximum, it is preferable to focusedly use the polyketone fiber cord in a site of applying a large tensile stress to the carcass ply in the run-flat running. As a result of analysis on numerical value through a computer, it is revealed that such a site is a region A ranging from a belt end to a maximum width part of a tire side portion and a region B ranging from a neighborhood of a bead core to a bead filler. Therefore, by disposing the reinforcing cord layer 8 using the polyketone fiber cord in at least a part of the region A ranging from a belt end to a maximum width part of a tire side portion and the region B ranging from a neighborhood of a bead core to a bead filler can be effectively improved the run-flat durability of the tire without increasing the tire weight.

Also, the tire weight can be largely reduced, for example, by replacing the carcass comprised of two carcass plies using the conventional rayon with one carcass ply using the polyketone fiber cord and one reinforcing cord layer using the polyketone fiber cord. Furthermore, by applying the side reinforcing rubber layer 7 thinned so that the run-flat durability is made equal to that of the conventional product can be further reduced the tire weight but also it is made possible to decrease the longitudinal spring of the tire to improve the ride comfort.

Moreover, there is a problem that as the number of carcass plies constituting the carcass 3 is decreased, the durability lowers against an instant large input on an uneven road surface (projections, pot holes) or a heaving road or against a local input (side cut) to the sidewall portion 6. On the contrary, when the reinforcing cord layer 8 is disposed in the region A ranging from a belt end to a maximum width part of a tire side portion, the side cut resistance can be improved as compared with the tire comprising the carcass comprised of two carcass plies using the conventional rayon. Also, when the reinforcing cord layer 8 is disposed in the region B ranging from a neighborhood of the bead core 2 to the bead filler 9, the durability against the pot hole input or the instant large load input on heaving road can be improved as compared with the tire comprising the carcass comprised of two carcass plies using the conventional rayon. Further, when the reinforcing cord layers are disposed on the region A ranging from a belt end to a maximum width part of a tire side portion and the region B ranging from a neighborhood of a bead core to a bead filler, the tire strength against an irregular input on a rough road can be improved but also the run-flat durability can be further improved.

Moreover, as a means for simultaneously attaining the improvement of the run-flat durability, the improvement of the durability on rough road or the like and the reduction of the tire weight, there is a method wherein the structure of the carcass 3 is rendered into an envelop structure as shown in FIG. 10 (a structure of extending the turnup end of the carcass 3 beneath the belt 10), but there is a problem that the tire uniformity lowers due to the overlapping of joint portions of the carcass 3. On the contrary, when the carcass 3 having the envelop structure with the conventional rayon is replaced, for example, with one carcass ply using the polyketone fiber cord and one reinforcing cord layer using the polyketone fiber cord, the joint portions of the carcass 3 are not overlapped and hence the deterioration of the tire uniformity can be avoided.

In the run-flat tire (4) for passenger cars, the reinforcing cord layer 8 is preferable to be at least a part of the region A ranging from a belt end to a maximum width part of a tire side portion and the region B ranging from a neighborhood of a bead core to a bead filler. In this case, the run-flat durability of the tire can be improved effectively.

In the tires (2), (3) and (4), an angle of the polyketone fiber cord in the reinforcing cord layer 8 with respect to the radial direction of the tire is preferably within a range of 0-85°. When the angle of the polyketone fiber cord with respect to the radial direction of the tire exceeds 85°, there is a tendency that the deflection of the tire can not be suppressed sufficiently in the run-flat running and the run-flat durability of the tire can not be improved sufficiently.

In the tires (2), (3), and (4), the polyketone fiber cord is preferable to have a twisting coefficient (Nt) defined by the following equation (III) of not less than 0.25:

$$Nt=\tan\theta=0.001\times N\times(0.125\times D/\rho)^{1/2} \quad (III)$$

[wherein N is a twisting number (turns/10 cm) and ρ is a specific gravity of cord (g/cm³) and D is a total decitex number of cord (dtex)]. When the twisting coefficient (Nt) of the polyketone fiber cord is less than 0.25, the fatigue property is considerably deteriorated and the durability is lacking.

In the reinforcing cord layer 8 of the tires (2), (3) and (4), it is preferable that the end count of the polyketone fiber cords is within a range of 5-60 (cords/50 mm). When the end count of the polyketone fiber cords in the reinforcing cord layer 8 is less than 5 (cords/50 mm), there is a tendency that the deflection of the tire can not be sufficiently suppressed in the run-flat running and the run-flat durability of the tire can not be sufficiently improved, while when it exceeds 60 (cords/50 mm), the longitudinal spring of the tire rises in the usual running and there is a tendency that the ride comfort of the tire is deteriorated in the usual running.

As to the support of the driving force in the run-flat running, the side reinforcing rubber layer 7 mainly plays a role in the conventional structure. In the actual use is almost a case that a large camber angle is applied at a state of mounting onto a vehicle, so that the ground contacting is largely displaced in a direction subjected to the camber angle (i.e. the ground contacting is largely displaced to a side that the camber angle is small) and the driving force is not equal in both the sides of the tire but concentrates in a sidewall portion 6 of a direction subjected to the camber angle (i.e. sidewall portion located at a side that the camber angle is small). Therefore, the tire breakage in the run-flat running occurs in a side reinforcing rubber layer 7 of a direction subjected to the camber angle (side reinforcing rubber layer at an inside of the vehicle-mounted state in many cases).

Figure 12:
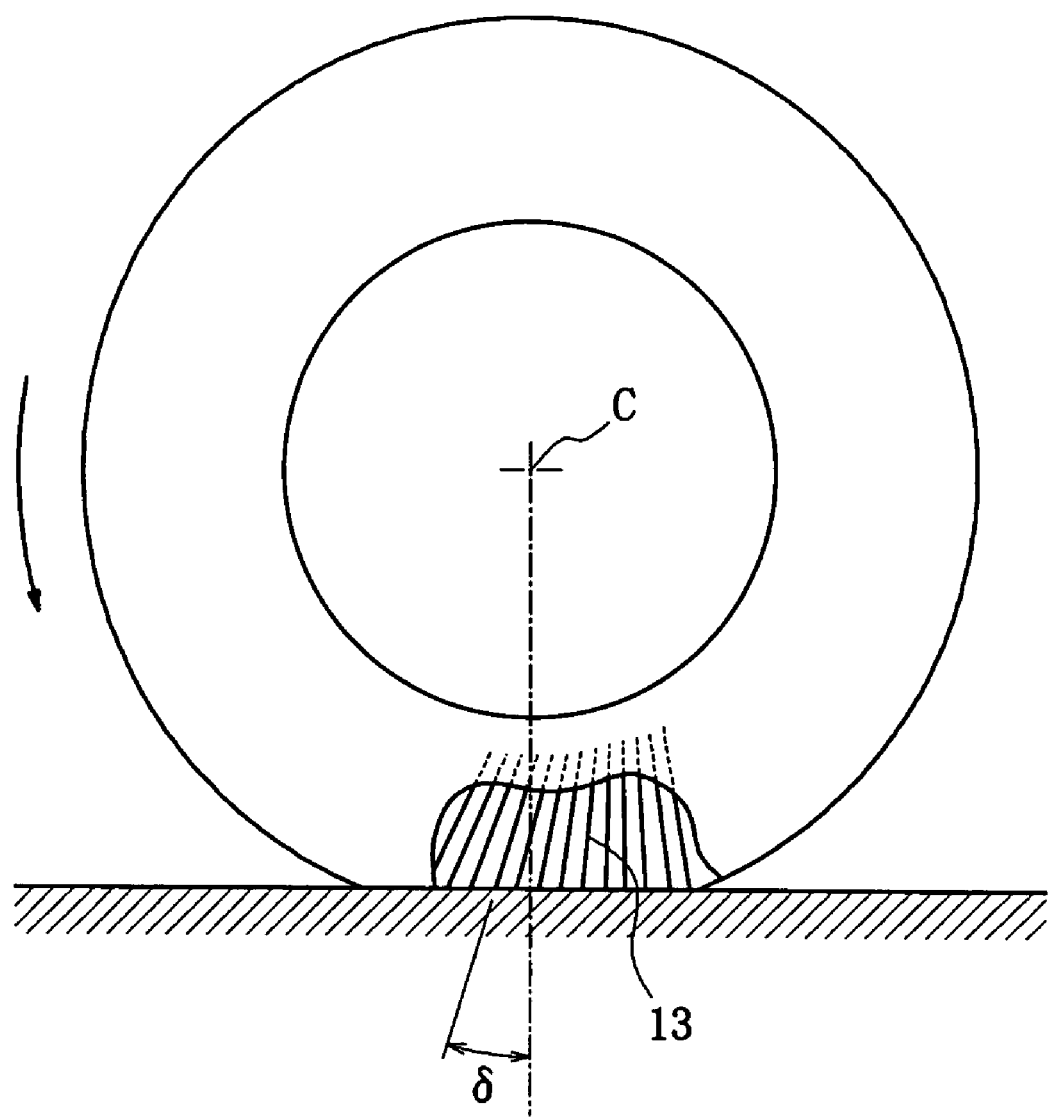
FIG. 12 is a partial section view of a side face portion of a tire illustrating an inclination angle of a cord constituting a reinforcing cord layer disposed in a run-flat tire of the above item (3).
Figure 13:
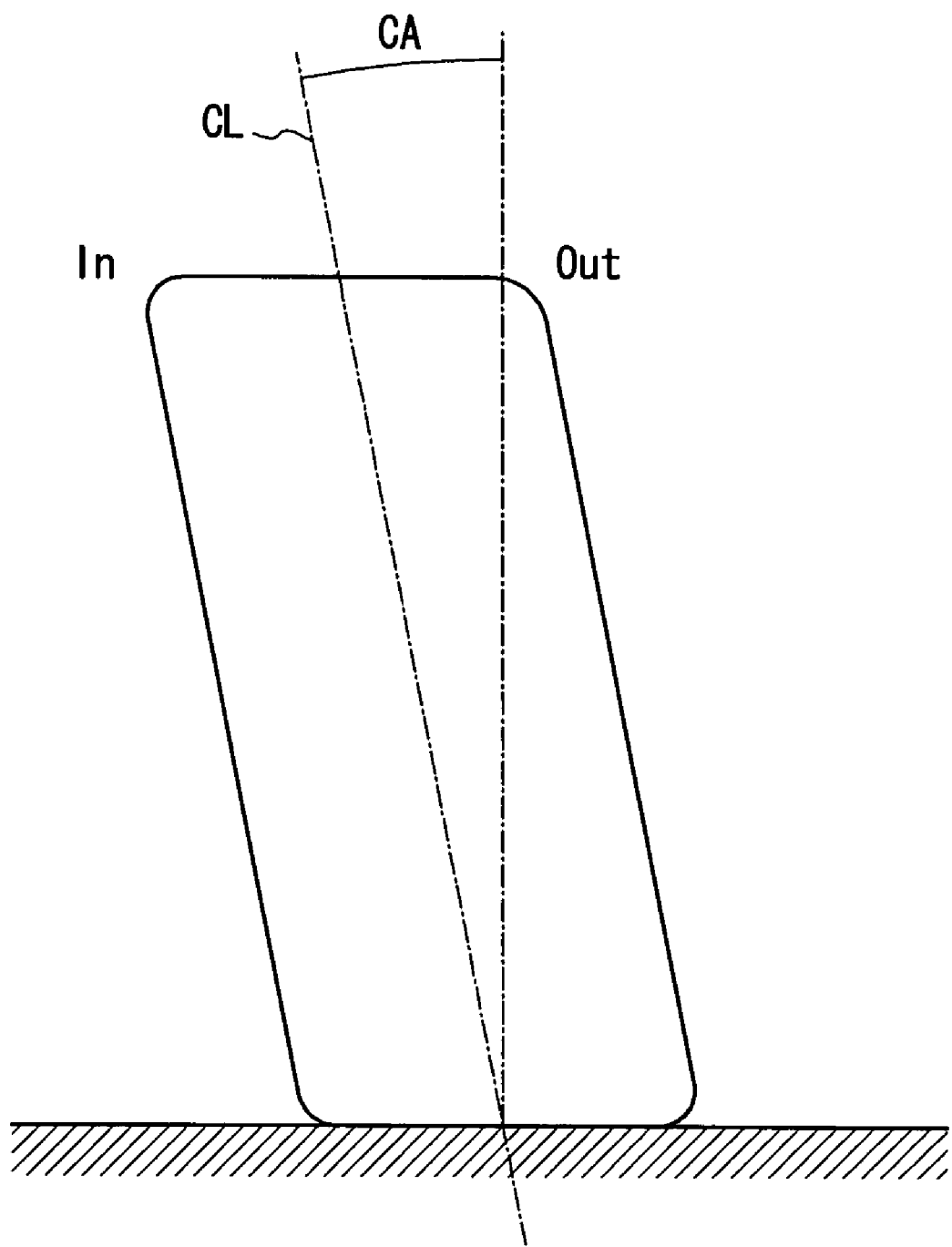
FIG. 13 is a front view of a typical tire showing a camber angle.

In the run-flat tires (2), (3) and (4), therefore, it is preferable that cords 13 constituting the reinforcing cord layer 8 disposed at the side of the tire so that an angle between a road surface and an equatorial plane CL of the tire becomes not more than 90° at a run-flat running state are inclined in a direction opposite to a rotating direction of the tire with respect to the radial direction as shown in FIG. 12 and an inclination angle δ of the cord 13 with respect to the radial direction of the tire is within a range of 0-20°. Thus, the reinforcing cord layer 8 at a side of the tire of a direction subjected to the camber angle (see also FIG. 13) is inclined in an orientation capable of supporting the driving force, whereby the driving force can be supported efficiently by the reinforcing cord layer 8, and hence the support of the driving force by the side reinforcing rubber layer 7 can be mitigated to largely improve the run-flat durability.

In the run-flat tires (2), (3) and (4), an end of the reinforcing cord layer 8 is preferable to have a turnup structure wound around the bead core 2 as shown in FIG. 4. Thus, it is possible to further effectively increase the rigidity of the bead filler 9, and also it is possible to improve the lateral rigidity at the run-flat state.

In the run-flat tires (2), (3) and (4), the angle of the polyketone fiber cord in the reinforcing cord layer 8 with respect to the radial direction of the tire is also preferable to be not more than 5°. In order to mitigate tensile stress to the carcass by the reinforcing cord layer 8 in the tires (2), (3) and (4), the reinforcing cord layer 8 formed in the cord fabric of the polyketone fiber cords is arranged so that the angle of the polyketone fiber cord is not more than 5° with respect to the radial direction of the tire, whereby tensile stress to the carcass 3 can be mitigated effectively.

In the run-flat tires (2), (3) and (4), it is preferable that the polyketone fiber cord has an elastic modulus at 25° C. under a load of 49N of 30-170 cN/dtex and a thermal shrinkage stress σ at 177° C. of 0.2-1.5 cN/dtex. In this case, the run-flat durability of the tire can be further improved because the rigidity and thermal shrinkage stress of the polyketone fiber cord are high.

The tire according to the invention can be produced according to a usual manner by disposing a cord layer using the polyketone fiber cords in at least a part of the region A ranging from a belt end to a maximum width part of a tire side portion and the region B ranging from a neighborhood of a bead core to a bead filler. Moreover, as a gas filled in the pneumatic tire according to the invention may be used usual air or air having a changed oxygen partial pressure, or an inert gas such as nitrogen or the like.

EXAMPLES

The following examples are given in illustration of the invention and are not intended as limitations thereof.

[Test 1]

A cord/rubber composite is prepared by arranging fiber cords having a material, a structure, a twisting coefficient, an elastic modulus and a thermal shrinkage stress shown in Table 1 in parallel at an end count shown in Table 1 and covering with a coating rubber. By using such a cord/rubber composite in a carcass ply is prepared a run-flat tire of a side reinforcement type having a structure shown in FIG. 8 and a tire size of 215/45ZR17. Also, the longitudinal spring and run-flat durability of the resulting tire are evaluated by the following methods to obtain results shown in Table 1.

(1-1) Longitudinal Spring

A load-deflection curve of the tire to be tested inflated under an internal pressure of 230 kPa is measured and a gradient of a tangent line at a certain load in the resulting load-deflection curve is a longitudinal spring constant and is represented by an index on the basis that the longitudinal spring constant of the tire of Comparative Example 1 is 100. The larger the index value, the larger the longitudinal spring constant.

(1-2) Run-Flat Durability

The tire to be tested is subjected to a drum test under conditions of load: 4.17 kN, speed: 89 km/h and temperature: 38° C. without filling the internal pressure to measure a running distance until troubles of the tire are caused, which is represented by an index on the basis that the running distance of the tire of Comparative Example 1 until the troubles are caused is 100. The larger the index value, the longer the running distance until the troubles are caused and the better the run-flat durability.

tire durability in the run-flat running is largely improved while suppressing the rise of the longitudinal spring of the tire in the usual running or maintaining the ride comfort in the usual running as compared with the tire of Comparative Example 1 using rayon cord as a reinforcing cord for the carcass ply.

[Test 2]

A cord/rubber composite is prepared by arranging fiber cords having a material, a structure, a twisting coefficient, an elastic modulus and a thermal shrinkage stress shown in Tables 2-1 to 2-5 in parallel at an end count shown in Tables 2-1 to 2-5 and covering with a coating rubber. By using such a cord/rubber composite in a reinforcing cord layer 8 of tires having a structure as shown in FIGS. 1-5 is prepared a run-flat tire of a side reinforcement type having a tire size of 215/45ZR17. Moreover, an angle of the cord in the reinforcing cord layer 8 with respect to a radial direction of the tire is shown in Tables 2-1 to 2-5. Also, there is prepared a tire having the same structure except that the reinforcing cord layer 8 is not used (Comparative Example 2). Then, the longitudinal spring and run-flat durability of the thus obtained tires are evaluated by the following methods to obtain results shown in Tables 2-1 to 2-5.

(2-1) Longitudinal Spring

A load-deflection curve of the tire to be tested inflated under an internal pressure of 230 kPa is measured and a gradient of a tangent line at a certain load in the resulting load-deflection curve is a longitudinal spring constant and is represented by an index on the basis that the longitudinal

TABLE 1

| | | | Comparative Example 1 | Example 1-1 | Example 1-2 | Example 1-3 | Example 1-4 | Example 1-5 |
|---|---|---|---|---|---|---|---|---|
| Carcass ply construction | material of reinforcing cord | — | rayon | polyketone *1 | polyketone *1 | polyketone *1 | polyketone *1 | polyketone *1 |
| | cord structure | dtex/filaments | 1840/3 | 1670/2 | 1670/2 | 1670/2 | 1670/2 | 1670/2 |
| | ply twist × cable twist N | turns/10 cm | 39 × 39 | 20 × 20 | 25 × 25 | 39 × 39 | 47 × 47 | 53 × 53 |
| | specific gravity of cord ρ | g/cm³ | 1.52 | 1.30 | 1.30 | 1.30 | 1.30 | 1.30 |
| | twisting coefficient Nt | — | 0.83 | 0.36 | 0.45 | 0.70 | 0.84 | 0.94 |
| | elastic modulus of cord at 25° C. under load of 49 N | cN/dtex | 46 | 165 | 162 | 145 | 124 | 109 |
| | thermal shrinkage stress σ at 177° C. of cord | cN/dtex | 0.00 | 0.26 | 0.26 | 0.51 | 0.63 | 0.57 |
| | end count | cords/50 mm | 45 | 50 | 50 | 50 | 50 | 50 |
| Tire evaluation | longitudinal spring in usual running | index | 100 | 98 | 98 | 99 | 101 | 96 |
| | run-flat durability | index | 100 | 195 | 188 | 205 | 206 | 201 |

*1: polyketone in which approximately 100% comprises a repeating unit represented by the formula (IV) and not less than 97% of the repeating unit is 1-oxotrimethylene.

As seen from Table 1, in the tires of the Examples using the polyketone fiber cord satisfying the conditions of the equations (I) and (II) as a reinforcing cord for the carcass ply, the spring constant of the tire of Comparative Example 2 is 100. The larger the index value, the larger the longitudinal spring constant.

(2-2) Run-Flat Durability

The tire to be tested is subjected to a drum test under conditions of load: 4.17 kN, speed: 89 km/h and temperature: 38° C. without filling the internal pressure to measure a running distance until troubles of the tire are caused, which is represented by an index on the basis that the running distance of the tire of Comparative Example 2 until the troubles are caused is 100. The larger the index value, the longer the running distance until the troubles are caused and the better the run-flat durability.

TABLE 2-1

| | | | Comparative Example 2 | Example 2-1-1 | Example 2-1-2 | Example 2-1-3 | Example 2-1-4 |
|---|---|---|---|---|---|---|---|
| Construction of reinforcing cord layer | structure of reinforcing cord layer | — | no arrangement of reinforcing cord layer | FIG. 1 | FIG. 1 | FIG. 1 | FIG. 1 |
| | material of reinforcing cord | — | | polyketone *1 | polyketone *1 | polyketone *1 | polyketone *1 |
| | cord structure | dtex/filaments | | 1670/2 | 1670/2 | 1670/2 | 1670/2 |
| | ply twist × cable twist N | turns/10 cm | | 15 × 15 | 20 × 20 | 25 × 25 | 39 × 39 |
| | specific gravity of cord ρ | g/cm³ | | 1.30 | 1.30 | 1.30 | 1.30 |
| | twisting coefficient Nt | — | | 0.26 | 0.36 | 0.45 | 0.70 |
| | elastic modulus E at 25° C. under a load of 49 N of cord | cN/dtex | | 174 | 165 | 162 | 145 |
| | thermal shrinkage stress σ at 177° C. of cord | cN/dtex | | 0.10 | 0.26 | 0.26 | 0.51 |
| | end count | cords/50 mm | | 50 | 50 | 50 | 50 |
| | cord angle | ° | | 0 | 0 | 0 | 0 |
| Tire evaluation | longitudinal spring in usual running | index | 100 | 100 | 98 | 98 | 99 |
| | run-flat durability | index | 100 | 195 | 195 | 188 | 205 |

| | | | Example 2-1-5 | Example 2-1-6 | Example 2-1-7 | Example 2-1-8 |
|---|---|---|---|---|---|---|
| Construction of reinforcing cord layer | structure of reinforcing cord layer | — | FIG. 1 | FIG. 1 | FIG. 1 | FIG. 1 |
| | material of reinforcing cord | — | polyketone *1 | polyketone *1 | polyketone *1 | polyketone *1 |
| | cord structure | dtex/filaments | 1670/2 | 1670/2 | 1670/2 | 1670/2 |
| | ply twist × cable twist N | turns/10 cm | 47 × 47 | 53 × 53 | 47 × 47 | 47 × 47 |
| | specific gravity of cord ρ | g/cm³ | 1.30 | 1.30 | 1.30 | 1.30 |
| | twisting coefficient Nt | — | 0.84 | 0.94 | 0.84 | 0.84 |
| | elastic modulus E at 25° C. under a load of 49 N of cord | cN/dtex | 124 | 109 | 124 | 124 |
| | thermal shrinkage stress σ at 177° C. of cord | cN/dtex | 0.63 | 0.57 | 0.63 | 0.63 |
| | end count | cords/50 mm | 50 | 50 | 50 | 50 |
| | cord angle | ° | 0 | 0 | 45 | 80 |
| Tire evaluation | longitudinal spring in usual running | index | 101 | 96 | 103 | 104 |
| | run-flat durability | index | 206 | 201 | 208 | 205 |

*1: polyketone in which approximately 100% comprises a repeating unit represented by the formula (IV) and not less than 97% of the repeating unit is 1-oxotrimethylene.

TABLE 2-2

| | | | Comparative Example 2 | Example 2-2-1 | Example 2-2-2 | Example 2-2-3 | Example 2-2-4 |
|---|---|---|---|---|---|---|---|
| Construction of reinforcing cord layer | structure of reinforcing cord layer | — | no arrangement of reinforcing cord layer | FIG. 2 | FIG. 2 | FIG. 2 | FIG. 2 |
| | material of reinforcing cord | — | | polyketone *1 | polyketone *1 | polyketone *1 | polyketone *1 |
| | cord structure | dtex/filaments | | 1670/2 | 1670/2 | 1670/2 | 1670/2 |
| | ply twist × cable twist N | turns/10 cm | | 15 × 15 | 20 × 20 | 25 × 25 | 39 × 39 |
| | specific gravity of cord ρ | g/cm³ | | 1.30 | 1.30 | 1.30 | 1.30 |
| | twisting coefficient Nt | — | | 0.26 | 0.36 | 0.45 | 0.70 |
| | elastic modulus E at 25° C. under a | cN/dtex | | 174 | 165 | 162 | 145 |

TABLE 2-2-continued

| | | | | | | |
|---|---|---|---|---|---|---|
| | load of 49 N of cord | | | | | | |
| | thermal shrinkage stress σ at 177° C. of cord | cN/dtex | | 0.10 | 0.26 | 0.26 | 0.51 |
| | end count | cords/50 mm | | 50 | 50 | 50 | 50 |
| | cord angle | ° | | 0 | 0 | 0 | 0 |
| Tire evaluation | longitudinal spring in usual running | index | 100 | 100 | 98 | 98 | 99 |
| | run-flat durability | index | 100 | 156 | 156 | 150.4 | 164 |

| | | | Example 2-2-5 | Example 2-2-6 | Example 2-2-7 | Example 2-2-8 |
|---|---|---|---|---|---|---|
| Construction of reinforcing cord layer | structure of reinforcing cord layer | — | FIG. 2 | FIG. 2 | FIG. 2 | FIG. 2 |
| | material of reinforcing cord | — | polyketone *1 | polyketone *1 | polyketone *1 | polyketone *1 |
| | cord structure | dtex/filaments | 1670/2 | 1670/2 | 1670/2 | 1670/2 |
| | ply twist × cable twist N | turns/10 cm | 47 × 47 | 53 × 53 | 47 × 47 | 47 × 47 |
| | specific gravity of cord ρ | g/cm³ | 1.30 | 1.30 | 1.30 | 1.30 |
| | twisting coefficient Nt | — | 0.84 | 0.94 | 0.84 | 0.84 |
| | elastic modulus E at 25° C. under a load of 49 N of cord | cN/dtex | 124 | 109 | 124 | 124 |
| | thermal shrinkage stress σ at 177° C. of cord | cN/dtex | 0.63 | 0.57 | 0.63 | 0.63 |
| | end count | cords/50 mm | 50 | 50 | 50 | 50 |
| | cord angle | ° | 0 | 0 | 45 | 80 |
| Tire evaluation | longitudinal spring in usual running | index | 101 | 96 | 103 | 104 |
| | run-flat durability | index | 164.8 | 160.8 | 166.4 | 164 |

*1: polyketone in which approximately 100% comprises a repeating unit represented by the formula (IV) and not less than 97% of the repeating unit is 1-oxotrimethylene.

TABLE 2-3

| | | | Comparative Example 2 | Example 2-3-1 | Example 2-3-2 | Example 2-3-3 | Example 2-3-4 |
|---|---|---|---|---|---|---|---|
| Construction of reinforcing cord layer | structure of reinforcing cord layer | — | no arrangement of reinforcing cord layer | FIG. 3 | FIG. 3 | FIG. 3 | FIG. 3 |
| | material of reinforcing cord | — | | polyketone *1 | polyketone *1 | polyketone *1 | polyketone *1 |
| | cord structure | dtex/filaments | | 1670/2 | 1670/2 | 1670/2 | 1670/2 |
| | ply twist × cable twist N | turns/10 cm | | 15 × 15 | 20 × 20 | 25 × 25 | 39 × 39 |
| | specific gravity of cord ρ | g/cm³ | | 1.30 | 1.30 | 1.30 | 1.30 |
| | twisting coefficient Nt | — | | 0.26 | 0.36 | 0.45 | 0.70 |
| | elastic modulus E at 25° C. under a load of 49 N of cord | cN/dtex | | 174 | 165 | 162 | 145 |
| | thermal shrinkage stress σ at 177° C. of cord | cN/dtex | | 0.10 | 0.26 | 0.26 | 0.51 |
| | end count | cords/50 mm | | 50 | 50 | 50 | 50 |
| | cord angle | ° | | 0 | 0 | 0 | 0 |
| Tire evaluation | longitudinal spring in usual running | index | 100 | 100 | 98 | 98 | 99 |
| | run-flat durability | index | 100 | 140 | 140 | 135 | 148 |

TABLE 2-3-continued

|  |  |  | Example 2-3-5 | Example 2-3-6 | Example 2-3-7 | Example 2-3-8 |
|---|---|---|---|---|---|---|
| Construction of reinforcing cord layer | structure of reinforcing cord layer | — | FIG. 3 | FIG. 3 | FIG. 3 | FIG. 3 |
|  | material of reinforcing cord | — | polyketone *1 | polyketone *1 | polyketone *1 | polyketone *1 |
|  | cord structure | dtex/filaments | 1670/2 | 1670/2 | 1670/2 | 1670/2 |
|  | ply twist × cable twist N | turns/10 cm | 47 × 47 | 53 × 53 | 47 × 47 | 47 × 47 |
|  | specific gravity of cord ρ | g/cm³ | 1.30 | 1.30 | 1.30 | 1.30 |
|  | twisting coefficient Nt | — | 0.84 | 0.94 | 0.84 | 0.84 |
|  | elastic modulus E at 25° C. under a load of 49 N of cord | cN/dtex | 124 | 109 | 124 | 124 |
|  | thermal shrinkage stress σ at 177° C. of cord | cN/dtex | 0.63 | 0.57 | 0.63 | 0.63 |
|  | end count | cords/50 mm | 50 | 50 | 50 | 50 |
|  | cord angle | ° | 0 | 0 | 45 | 80 |
| Tire evaluation | longitudinal spring in usual running | index | 101 | 96 | 103 | 104 |
|  | run-flat durability | index | 148 | 145 | 150 | 148 |

*1: polyketone in which approximately 100% comprises a repeating unit represented by the formula (IV) and not less than 97% of the repeating unit is 1-oxotrimethylene.

TABLE 2-4

|  |  |  | Comparative Example 2 | Example 2-4-1 | Example 2-4-2 | Example 2-4-3 | Example 2-4-4 |
|---|---|---|---|---|---|---|---|
| Construction of reinforcing cord layer | structure of reinforcing cord layer | — | no arrangement of reinforcing cord layer | FIG. 4 | FIG. 4 | FIG. 4 | FIG. 4 |
|  | material of reinforcing cord | — |  | polyketone *1 | polyketone *1 | polyketone *1 | polyketone *1 |
|  | cord structure | dtex/filaments |  | 1670/2 | 1670/2 | 1670/2 | 1670/2 |
|  | ply twist × cable twist N | turns/10 cm |  | 15 × 15 | 20 × 20 | 25 × 25 | 39 × 39 |
|  | specific gravity of cord ρ | g/cm³ |  | 1.30 | 1.30 | 1.30 | 1.30 |
|  | twisting coefficient Nt | — |  | 0.26 | 0.36 | 0.45 | 0.70 |
|  | elastic modulus E at 25° C. under a load of 49 N of cord | cN/dtex |  | 174 | 165 | 162 | 145 |
|  | thermal shrinkage stress σ at 177° C. of cord | cN/dtex |  | 0.10 | 0.26 | 0.26 | 0.51 |
|  | end count | cords/50 mm |  | 50 | 50 | 50 | 50 |
|  | cord angle | ° |  | 0 | 0 | 0 | 0 |
| Tire evaluation | longitudinal spring in usual running | index | 100 | 103 | 101 | 101 | 102 |
|  | run-flat durability | index | 100 | 195 | 195 | 188 | 205 |

|  |  |  | Example 2-4-5 | Example 2-4-6 | Example 2-4-7 | Example 2-4-8 |
|---|---|---|---|---|---|---|
| Construction of reinforcing cord layer | structure of reinforcing cord layer | — | FIG. 4 | FIG. 4 | FIG. 4 | FIG. 4 |
|  | material of reinforcing cord | — | polyketone *1 | polyketone *1 | polyketone *1 | polyketone *1 |
|  | cord structure | dtex/filaments | 1670/2 | 1670/2 | 1670/2 | 1670/2 |
|  | ply twist × cable twist N | turns/10 cm | 47 × 47 | 53 × 53 | 47 × 47 | 47 × 47 |
|  | specific gravity of cord ρ | g/cm³ | 1.30 | 1.30 | 1.30 | 1.30 |
|  | twisting coefficient Nt | — | 0.84 | 0.94 | 0.84 | 0.84 |
|  | elastic modulus E at 25° C. under a load of 49 N of cord | cN/dtex | 124 | 109 | 124 | 124 |
|  | thermal shrinkage stress σ at 177° C. of cord | cN/dtex | 0.63 | 0.57 | 0.63 | 0.63 |
|  | end count | cords/50 mm | 50 | 50 | 50 | 50 |
|  | cord angle | ° | 0 | 0 | 45 | 80 |

TABLE 2-4-continued

|  |  |  |  |  |  |  |
|---|---|---|---|---|---|---|
| Tire evaluation | longitudinal spring in usual running | index | 104 | 99 | 106 | 107 |
|  | run-flat durability | index | 206 | 201 | 208 | 205 |

*1: polyketone in which approximately 100% comprises a repeating unit represented by the formula (IV) and not less than 97% of the repeating unit is 1-oxotrimethylene.

TABLE 2-5

|  |  |  | Comparative Example 2 | Example 2-5-1 | Example 2-5-2 | Example 2-5-3 | Example 2-5-4 |
|---|---|---|---|---|---|---|---|
| Construction of reinforcing cord layer | structure of reinforcing cord layer | — | no arrangement of reinforcing cord layer | FIG. 5 | FIG. 5 | FIG. 5 | FIG. 5 |
|  | material of reinforcing cord | — |  | polyketone *1 | polyketone *1 | polyketone *1 | polyketone *1 |
|  | cord structure | dtex/filaments |  | 1670/2 | 1670/2 | 1670/2 | 1670/2 |
|  | ply twist × cable twist N | turns/10 cm |  | 15 × 15 | 20 × 20 | 25 × 25 | 39 × 39 |
|  | specific gravity of cord ρ | g/cm³ |  | 1.30 | 1.30 | 1.30 | 1.30 |
|  | twisting coefficient Nt | — |  | 0.26 | 0.36 | 0.45 | 0.70 |
|  | elastic modulus E at 25° C. under a load of 49 N of cord | cN/dtex |  | 174 | 165 | 162 | 145 |
|  | thermal shrinkage stress σ at 177° C. of cord | cN/dtex |  | 0.10 | 0.26 | 0.26 | 0.51 |
|  | end count | cords/50 mm |  | 50 | 50 | 50 | 50 |
|  | cord angle | ° |  | 0 | 0 | 0 | 0 |
| Tire evaluation | longitudinal spring in usual running | index | 100 | 100 | 98 | 98 | 99 |
|  | run-flat durability | index | 100 | 191 | 191 | 184 | 201 |

|  |  |  | Example 2-5-5 | Example 2-5-6 | Example 2-5-7 | Example 2-5-8 |
|---|---|---|---|---|---|---|
| Construction of reinforcing cord layer | structure of reinforcing cord layer | — | FIG. 5 | FIG. 5 | FIG. 5 | FIG. 5 |
|  | material of reinforcing cord | — | polyketone *1 | polyketone *1 | polyketone *1 | polyketone *1 |
|  | cord structure | dtex/filaments | 1670/2 | 1670/2 | 1670/2 | 1670/2 |
|  | ply twist × cable twist N | turns/10 cm | 47 × 47 | 53 × 53 | 47 × 47 | 47 × 47 |
|  | specific gravity of cord ρ | g/cm³ | 1.30 | 1.30 | 1.30 | 1.30 |
|  | twisting coefficient Nt | — | 0.84 | 0.94 | 0.84 | 0.84 |
|  | elastic modulus E at 25° C. under a load of 49 N of cord | cN/dtex | 124 | 109 | 124 | 124 |
|  | thermal shrinkage stress σ at 177° C. of cord | cN/dtex | 0.63 | 0.57 | 0.63 | 0.63 |
|  | end count | cords/50 mm | 50 | 50 | 50 | 50 |
|  | cord angle | ° | 0 | 0 | 45 | 80 |
| Tire evaluation | longitudinal spring in usual running | index | 101 | 96 | 103 | 104 |
|  | run-flat durability | index | 202 | 197 | 204 | 201 |

*1: polyketone in which approximately 100% comprises a repeating unit represented by the formula (IV) and not less than 97% of the repeating unit is 1-oxotrimethylene.

As seen from Tables 2-1 to 2-5, when the reinforcing cord layer using the polyketone fiber cord satisfying the conditions of the equations (I) and (II) is arranged in at least a part of a region A ranging from a belt end to a maximum width part of a tire side portion and a region B ranging from a neighborhood of a bead core to a bead filler in the run-flat tire of side reinforcement type, the tire durability in the run-flat running can be largely improved while suppressing the rise of the longitudinal spring of the tire in the usual running or without damaging the ride comfort of the tire in the usual running.

[Test 3]

There is prepared a run-flat tire having a structure shown in Table 3 and a tire size of 245/45R17. Moreover, the tires of Example 3-1 and Examples 3-3 to 3-6 have a structure shown in FIG. 1, and the tire of Example 3-2 has a structure shown in FIG. 4, and a tire of Reference Example is a tire wherein a carcass ply is added to the carcass in the tire of Example 3-2 (i.e. 2 plies in total), and the tire of Comparative Example 3 has a structure shown in FIG. 8. The reinforcing cord constituting the reinforcing cord layer is made from polyketone fiber in the tires of Examples 3-1 to 3-6 and Reference Example. Moreover, the elastic modulus E at 25° C. under 49N and thermal shrinkage stress σ at 177° C. of the polyketone fiber cord used are shown in Table 3.

In the tires of Comparative Example 3, Examples 3-1 to 3-6 and Reference Example, a material of the carcass is rayon. Also, a side reinforcing rubber layer having a crescent shape at section is arranged between the carcass and the innerliner in the tires of Comparative Example 3, Examples 3-1 to 3-6 and Reference Example. Furthermore, in the tires of Comparative Example 3, Examples 3-1 to 3-6 and Reference Example, the belt is comprised of two belt layers, and an angle of a belt cord constituting the belt layer with respect to an axis in the radial direction is 64°. Moreover, in the tires of Comparative Example 3, Examples 3-1 to 3-6 and Reference Example, the belt reinforcing layer is a structure of "one cap+one layer". The various conditions of each tire are shown in Table 3.

In this test example, the tire to be tested is mounted onto a right rear wheel of BMW328i. Then, the tire is run on a test circuit course at a run-flat state under conditions of nominal load and speed of 80 km/h to evaluate the ride comfort and run-flat durability. The ride comfort is evaluated as a longitudinal spring value under usual internal pressure assuming the usual running of the tire. The run-flat durability is evaluated as a run-flat durable distance. Moreover, values of a rot product are shown as a maximum gauge of a side reinforcing rubber layer and a tire weight in Table 3.

In this test example, an evaluation index as a relative evaluation to tires of Examples 3-1 to 3-6 and tire of Reference Example is calculated on the basis that an evaluation index of the tire of Comparative Example 3 is 100. The evaluations results are also shown in Table 3. In the evaluation results of Table 3, the larger the evaluation index value, the better the run-flat durable distance, and the smaller the evaluation index value, the better the other performances.

TABLE 3

| | Tire of Comparative Example 3 | Tire of Example 3-1 | Tire of Example 3-2 | Tire of Example 3-3 | Tire of Example 3-4 | Tire of Example 3-5 | Tire of Example 3-6 | Tire of Reference Example |
|---|---|---|---|---|---|---|---|---|
| Ply structure | 2P H/L | 1P H | 1P H | 1P H | 1P H | 1P H | 1P H | 2P H/L |
| Presence or absence of reinforcing cord layer | absence | presence | presence | presence | presence | presence | presence | presence |
| Material of reinforcing cord layer | — | polyketone | polyketone | polyketone | polyketone | polyketone | polyketone | polyketone |
| Cord structure (dtex/filaments) | — | 1670/2 | 1670/2 | 1670/2 | 1670/2 | 1670/2 | 1670/2 | 1670/2 |
| Ply twist × Cable twist (turns/10 cm) | — | 39 × 39 | 39 × 39 | 39 × 39 | 20 × 20 | 47 × 47 | 53 × 53 | 39 × 39 |
| Twisting coefficient | — | 0.70 | 0.70 | 0.70 | 0.36 | 0.84 | 0.84 | 0.70 |
| Elastic modulus E at 25° C. under a load of 49 N (cN/dtex) | — | 145 | 145 | 145 | 165 | 124 | 86 | 145 |
| Thermal shrinkage stress σ at 177° C. (cN/dtex) | — | 0.51 | 0.51 | 0.51 | 0.26 | 0.63 | 0.47 | 0.51 |
| End count (cords/50 mm) | — | 50 | 50 | 50 | 50 | 50 | 60 | 50 |
| Presence or absence of turnup of reinforcing cord layer | — | absence | presence | absence | absence | absence | absence | presence |
| Inclination angle of reinforcing cord layer (°) (inside mounting) | — | 10 | 10 | 0 | 0 | 0 | 0 | 10 |
| Longitudinal spring in normal internal pressure (ride comfort in usual running) | 100 | 95 | 95 | 95 | 96 | 93 | 92 | 103 |
| Run-flat durable distance | 100 | 152 | 174 | 128 | 114 | 196 | 131 | 215 |
| Maximum gauge of side reinforcing rubber layer | 100 | 82 | 82 | 100 | 100 | 100 | 100 | 82 |
| Tire weight | 100 | 93 | 95 | 96 | 96 | 96 | 94 | 101 |

As seen from Table 3, in the tires of Examples 3-1 and 3-2, all performances are good evaluation as compared with the tire of Comparative Example 3. In the tires of Examples 3-3 to 3-6, the maximum gauge of the side reinforcing rubber layer is the same as that in the tire of Comparative Example 3, but the other performances are good evaluation as compared with the tire of Comparative Example 3.

In the tire of Reference Example, the run-flat durable distance and the maximum gauge of the side reinforcing rubber layer are good evaluation as compared with the tire of Comparative Example, but the ride comfort and tire weight are somewhat poor evaluation as compared with the tire of Comparative Example 3. However, all performances in the tire of Reference Example are good results as compared with the conventional run-flat tire having three carcass plies and no reinforcing cord layer, which is clear from a relative relationship between the tire of Comparative Example 3 and the tire of Example 3-2.

[Test 4]

There are prepared run-flat tires for passenger cars having a structure shown in Tables 4-1 to 4-3 and a tire size of 245/50R18. Moreover, the elastic modulus E at 25° C. under a load of 49N and thermal shrinkage stress σ at 177° C. of the polyketone fiber cord used in the carcass or the reinforcing cord layer are shown in Tables 4-1 to 4-3.

In tires of Comparative Examples 4-1 to 4-4 and tires of Examples 4-1 to 4-8, a side reinforcing rubber layer having a crescent shape at section is disposed between the carcass and the innerliner, and a maximum gauge of a side reinforcing rubber layer is changed so that a run-flat durability evaluated as mentioned later is made equal to that of the tire of Comparative Example 4-1. Furthermore, in the tires of Comparative Examples 4-1 to 4-4 and the tires of Examples 4-1 to 4-8, the belt is comprised of two belt layers, and an angle of a belt cord constituting the belt layer with respect to an axis in a radial direction is 64°. Also, the belt reinforcing layer in the tires of Comparative Examples 4-1 to 4-4 and the tires of Examples 4-1 to 4-8 is a structure of "one cap+one layer". Various conditions of each of the tires are shown in Tables 4-1 to 4-3. Moreover, the angle of the polyketone fiber cord in the reinforcing cord layer of the tires of Examples 4-1 to 4-8 with respect to the radial direction of the tire is shown in Tables 4-2 and 4-3.

In this test example, the run-flat durability is evaluated by subjecting the tire to be tested to a drum test under conditions of load: 635 kgf and speed: 89 km/h without filling an internal pressure to measure a running distance until troubles are caused in the tire. Also, the ride comfort is evaluated from a value of the longitudinal spring of the tire inflated under an internal pressure of 230 kPa. Further, the side cut resistance is evaluated by setting the tire inflated under an internal pressure of 230 kPa at an inclined state of 5° toward a side of a pendulum with respect to a vertical direction and pushing a convex part of a striker in a pendulum type impact score testing machine to calculate impact energy when the carcass ply is broken to confirm the bulging on the surface of the tire. In addition, the tire uniformity is evaluated by a magnitude of a change of force in the radial direction (RFV) generated during one rotation at a constant radius. Moreover, the tire weight is shown as a value of a rot product in Tables 4-1 to 4-3.

In this test example, an evaluation index as a relative evaluation to tires of Comparative Examples 4-2 to 4-4 and Examples 4-1 to 4-8 is calculated on the basis that an evaluation index of the tire of Comparative Example 4-1 is 100. The evaluations results are also shown in Tables 4-1 to 4-3. In the evaluation results of Tables 4-1 to 4-3, the larger the evaluation index value, the better the run-flat durable distance and side cut resistance, while the smaller the evaluation index value, the better the other performances.

TABLE 4-1

|  | Comparative Example 4-1 | Comparative Example 4-2 | Comparative Example 4-3 | Comparative Example 4-4 |
|---|---|---|---|---|
| Carcass structure | 2P H/L | 2P H/L | 1P enve | 1P H |
| Cord material in carcass | rayon | polyketone | polyketone | polyketone |
| Cord structure (dtex/filaments) | 1840/2 | 1670/2 | 1670/2 | 1670/2 |
| Ply twist × cable twist (turns/10 cm) | 47 × 47 | 47 × 47 | 47 × 47 | 47 × 47 |
| Twisting coefficient | 0.82 | 0.84 | 0.84 | 0.84 |
| Elastic modulus E at 25° C. under a load of 49N (cN/dtex) | 32 | 124 | 124 | 124 |
| Thermal shrinkage stress σ at 177° C. (cN/dtex) | 0 | 0.63 | 0.63 | 0.63 |
| End count (cords/50 mm) | 50 | 50 | 50 | 50 |
| Presence or absence and width of reinforcing cord layer | absence | absence | absence | absence |
| Material of reinforcing cord layer | — | — | — | — |
| Cord structure (dtex/filaments) | — | — | — | — |
| Ply twist × Cable twist (turns/10 cm) | — | — | — | — |
| Twisting coefficient | — | — | — | — |
| Elastic modulus E at 25° C. under a load of 49N (cN/dtex) | — | — | — | — |
| Thermal shrinkage stress σ at 177° C. (cN/dtex) | — | — | — | — |

TABLE 4-1-continued

|  | Comparative Example 4-1 | Comparative Example 4-2 | Comparative Example 4-3 | Comparative Example 4-4 |
|---|---|---|---|---|
| End count (cords/50 mm) | — | — | — | — |
| Inclination angle (°) | — | — | — | — |
| Tire structure | FIG. 9 | FIG. 9 | FIG. 10 | FIG. 8 |
| Run-flat durable distance | 100 | 100 | 100 | 100 |
| maximum gauge of side reinforcing rubber layer | 100 | 86 | 88 | 102 |
| Longitudinal spring in normal internal pressure (ride comfort in usual running) | 100 | 96 | 96 | 92 |
| Tire weight | 100 | 100 | 95 | 93 |
| Side cut resistance | 100 | 131 | 127 | 82 |
| Uniformity | 100 | 78 | 122 | 82 |

TABLE 4-2

|  | Example 4-1 | Example 4-2 | Example 4-3 | Example 4-4 |
|---|---|---|---|---|
| Carcass structure | 1P H | 1P H | 1P H | 1P H |
| Cord material in carcass | polyketone | polyketone | polyketone | polyketone |
| Cord structure (dtex/filaments) | 1670/2 | 1670/2 | 1670/2 | 1670/2 |
| Ply twist × cable twist (turns/10 cm) | 47 × 47 | 47 × 47 | 47 × 47 | 47 × 47 |
| Twisting coefficient | 0.84 | 0.84 | 0.84 | 0.84 |
| Elastic modulus E at 25° C. under a load of 49N (cN/dtex) | 124 | 124 | 124 | 124 |
| Thermal shrinkage stress σ at 177° C. (cN/dtex) | 0.63 | 0.63 | 0.63 | 0.63 |
| End count (cords/50 mm) | 50 | 50 | 50 | 50 |
| Presence or absence and width of reinforcing cord layer | presence 100 mm | presence 100 mm | presence 100 mm | presence 100 mm |
| Material of reinforcing cord layer | polyketone | polyketone | polyketone | polyketone |
| Cord structure (dtex/filaments) | 1670/2 | 1670/2 | 1670/2 | 1670/2 |
| Ply twist × Cable twist (turns/10 cm) | 47 × 47 | 20 × 20 | 39 × 39 | 53 × 53 |
| Twisting coefficient | 0.84 | 0.36 | 0.70 | 0.94 |
| Elastic modulus E at 25° C. under a load of 49N (cN/dtex) | 124 | 165 | 145 | 109 |
| Thermal shrinkage stress σ 177° C. (cN/dtex) | 0.63 | 0.26 | 0.51 | 0.57 |
| End count (cords/50 mm) | 50 | 50 | 50 | 50 |
| Inclination angle (°) | 10 | 10 | 10 | 10 |
| Tire structure | FIG. 1 | FIG. 1 | FIG. 1 | FIG. 1 |
| Run-flat durable distance | 100 | 100 | 100 | 100 |
| maximum gauge of side reinforcing rubber layer | 83 | 93 | 90 | 86 |
| Longitudinal spring in normal internal pressure (ride comfort in usual running) | 92 | 95 | 94 | 93 |
| Tire weight | 93 | 95 | 94 | 94 |
| Side cut resistance | 129 | 141 | 135 | 125 |
| Uniformity | 71 | 77 | 75 | 69 |

TABLE 4-3

|  | Example 4-5 | Example 4-6 | Example 4-7 | Example 4-8 |
|---|---|---|---|---|
| Carcass structure | 1P H | 1P H | 1P H | 1P H |
| Cord material in carcass | polyketone | polyketone | polyketone | polyketone |
| Cord structure (dtex/filaments) | 1670/2 | 1670/2 | 1670/2 | 1670/2 |

TABLE 4-3-continued

|  | Example 4-5 | Example 4-6 | Example 4-7 | Example 4-8 |
| --- | --- | --- | --- | --- |
| Ply twist × cable twist (turns/10 cm) | 47 × 47 | 20 × 20 | 39 × 39 | 53 × 53 |
| Twisting coefficient | 0.84 | 0.36 | 0.70 | 0.94 |
| Elastic modulus E at 25° C. under a load of 49N (cN/dtex) | 124 | 165 | 145 | 109 |
| Thermal shrinkage stress σ at 177° C. (cN/dtex) | 0.63 | 0.26 | 0.51 | 0.57 |
| End count (cords/50 mm) | 50 | 50 | 50 | 50 |
| Presence or absence and width of reinforcing cord layer | presence 50 mm | presence 100 mm | presence 100 mm | presence 100 mm |
| Material of reinforcing cord layer | polyketone | polyketone | polyketone | polyketone |
| Cord structure (dtex/filaments) | 1670/2 | 1670/2 | 1670/2 | 1670/2 |
| Ply twist × Cable twist (turns/10 cm) | 47 × 47 | 20 × 20 | 39 × 39 | 53 × 53 |
| Twisting coefficient | 0.84 | 0.36 | 0.70 | 0.94 |
| Elastic modulus E at 25° C. under a load of 49N (cN/dtex) | 124 | 165 | 145 | 109 |
| Thermal shrinkage stress σ at 177° C. (cN/dtex) | 0.63 | 0.26 | 0.51 | 0.57 |
| End count (cords/50 mm) | 50 | 50 | 50 | 50 |
| Inclination angle (°) | 10 | 0 | 0 | 0 |
| Tire structure | FIG. 6 | FIG. 1 | FIG. 1 | FIG. 1 |
| Run-flat durable distance | 100 | 100 | 100 | 100 |
| maximum gauge of side reinforcing rubber layer | 96 | 98 | 85 | 86 |
| Longitudinal spring in normal internal pressure (ride comfort in usual running) | 99 | 98 | 91 | 91 |
| Tire weight | 93 | 93 | 93 | 94 |
| Side cut resistance | 105 | 166 | 138 | 112 |
| Uniformity | 66 | 86 | 77 | 68 |

As seen from Tables 4-1, 4-2 and 4-3, all performances in the tires of Examples 4-1 to 4-8 are good evaluation as compared with the tire of Comparative Example 4-1. On the other hand, the tire of Comparative Example 4-2 has the same two carcass ply structure as in the tire of Comparative Example 4-1, so that the tire weight is not improved as compared with the tire of Comparative Example 4-1, while the tire of Comparative Example 4-3 has a carcass envelop structure, so that the uniformity is deteriorated as compared with the tire of Comparative Example 4-1, and the tire of Comparative Example 4-4 has a one ply carcass structure and no reinforcing cord layer, so that the maximum gauge of the side reinforcing rubber layer is deteriorated and also the side cut resistance is deteriorated as compared with the tire of Comparative Example 4-1.

The invention claimed is:

1. A run-flat tire comprising a sidewall portion provided with a side reinforcing rubber layer having a crescent shape at section, characterized in that a cord layer including a polyketone fiber cord satisfying the following conditions of the following equations I and II:

$$\sigma \geq -0.01 \times E + 1.2 \quad \text{I}$$

$$\sigma \geq 0.02 \quad \text{II}$$

wherein σ is a thermal shrinkage stress at 177° C. cN/dtex and E is an elastic modulus at 25° C. under a load of 49 N cN/dtex is disposed in at least a part of a region A ranging from a belt end to a maximum width part of a tire side portion and a region B ranging from a neighborhood of a bead core to a bead filler.

2. A run-flat tire according to claim 1, which comprises a pair of bead portions, a pair of sidewall portions, a tread portion continuing to both the sidewall portions, a carcass toroidally extending between the pair of bead portions to reinforce these portions and comprised of one or more carcass plies, and a pair of side reinforcing rubber layers arranged at an inside of the carcass in the side wall portions and having a crescent shape at section, wherein
the carcass ply is formed by covering a plurality of reinforcing cords arranged in parallel to each other with a coating rubber, and the reinforcing cord is a polyketone fiber cord obtained by twisting a plurality of filament bundles of polyketone, and the polyketone fiber cord satisfies the conditions of the above equations I and II.

3. A run-flat tire according to claim 2, wherein the polyketone fiber cord has a twisting coefficient Nt defined by the following equation III of not less than 0.34:

$$Nt = \tan \theta = 0.001 \times N \times (0.125 \times D/\rho)^{1/2} \quad \text{III}$$

wherein N is a twisting number turns/10 cm and ρ is a specific gravity of cord g/cm³ and D is a total decitex number of cord dtex.

4. A run-flat tire according to claim 2, wherein an end count of the polyketone fiber cords in the carcass ply is 35-60 cords/50 mm.

5. A run-flat tire according to claim 1, which comprises a radial carcass toroidally extending between a pair of bead cores embedded in respective bead portions and comprised of one or more carcass plies, a tread portion disposed on an outside of a crown portion of the radial carcass in a radial direction of the tire, a pair of buttress portions located at both end parts of the tread portion, a pair of sidewall portions each connecting the buttress portion to the bead portion, and a pair of side reinforcing rubber layers each disposed inside the radial carcass in a zone from the buttress portion to the sidewall portion and having a crescent shape at section, wherein
    a reinforcing cord layer formed by covering polyketone fiber cords, each of which being obtained by twisting a plurality of filament bundles of polyketone and satisfies the conditions of the above equations I and II, with a coating rubber is disposed in a region B ranging from a neighborhood of a bead core to a bead filler.

6. A run-flat tire according to claim 1, which comprises a carcass comprised of one or more carcass plies and having a turnup structure wound around a bead core located at both sides in a widthwise direction and a side reinforcing rubber layer disposed in a tire sidewall portion at each side in the widthwise direction of the tire and having a crescent shape at section, wherein
    a pair of reinforcing cord layers are rendered into a rigidity equal to or more than that of the carcass and disposed so as to cover at least a part of the side reinforcing rubber layer at each side in a widthwise direction of the tire from the outside of the carcass;
    the reinforcing cord layer is arranged adjacent to a portion of the carcass corresponding to a zone at least ranging from an end of a belt to a maximum width part of the tire side portion; and
    a cord constituting the reinforcing cord layer is a polyketone fiber cord satisfying the conditions of the above equations I and II.

7. A run-flat tire according to claim 1, which comprises a radial carcass toroidally extending between a pair of bead cores embedded in respective bead portions and comprised of one or more carcass plies, a tread portion disposed on an outside of a crown portion of the radial carcass in a radial direction of the tire, a pair of buttress portions located at both end part of the tread portion, a pair of sidewall portions each connecting the buttress portion to the bead portion, a pair of side reinforcing rubber layers disposed in the sidewall portions and having a crescent shape at section, a bead filler disposed at an outside of the bead core in the radial direction of the tire, and a reinforcing cord layer disposed on an outside of at least a part of the carcass, wherein
    a cord constituting the carcass ply and a cord constituting the reinforcing cord layer are polyketone fiber cords each satisfying the conditions of the above equations I and II.

8. A run-flat tire according to claim 7, wherein the reinforcing cord layer is at least a part of a region A ranging from a belt end to a maximum width part of a tire side portion and a region B ranging from a neighborhood of a bead core to a bead filler.

9. A run-flat tire according to claim 1, which comprises a radial carcass toroidally extending between a pair of bead cores embedded in respective bead portions and comprised of one or more carcass plies, a tread portion disposed on an outside of a crown portion of the radial carcass in a radial direction of the tire, a pair of buttress portions located at both end parts of the tread portion, a pair of sidewall portions each connecting the buttress portion to the bead portion, and a pair of side reinforcing rubber layers each disposed inside the radial carcass in a zone from the buttress portion to the sidewall portion and having a crescent shape at section, wherein
    a reinforcing cord layer formed by covering polyketone fiber cords, each of which being obtained by twisting a plurality of filament bundles of polyketone and satisfies the conditions of the above equations I and II, with a coating rubber is disposed in a region A ranging from a belt end to a maximum width part of a tire side portion.

10. A run-flat tire according to claim 9, wherein an angle of the polyketone fiber cord in the reinforcing cord layer with respect to the radial direction of the tire is 0-85°.

11. A run-flat tire according to claim 9, wherein the polyketone fiber cord has a twisting coefficient Nt defined by the equation III of not less than 0.25.

12. A run-flat tire according to claim 9, wherein an end count of the polyketone fiber cords in the reinforcing cord layer is 5-60 cords/50 mm.

13. A run-flat tire according to claim 9, wherein the cords constituting the reinforcing cord layer disposed at the side of the tire so that an angle between a road surface and an equatorial plane of the tire becomes not more than 90° at a run-flat running state are inclined in a direction opposite to a rotating direction of the tire with respect to the radial direction and an inclination angle of the cord with respect to the radial direction of the tire is within a range of 0-20°.

14. A run-flat tire according to claim 9, wherein an end of the reinforcing cord layer has a turnup structure wound around the bear core.

15. A run-flat tire according to claim 9, wherein an angle of the polyketone fiber cord in the reinforcing cord layer with respect to the radial direction of the tire is not more than 5°.

16. A run-flat tire according to claim 1, wherein the polyketone fiber cord has an elastic modulus E at 25° C. under a load of 49N of 30-170 cN/dtex and a thermal shrinkage stress a at 177° C. of 0.2-1.5 cN/dtex.

17. A run-flat tire according to claim 1, wherein the polyketone fiber cord is formed by twisting two or three filament bundles each of polyketone having a fineness of 500-2000 dtex.

18. A run-flat tire according to claim 1, wherein the polyketone fiber cord has a reversibility of shrinking at a high temperature and stretching in the turning to room temperature.

19. A run-flat tire according to claim 1, wherein the polyketone has substantially a repeating unit represented by the following general formula IV:

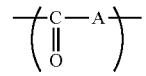

IV wherein A is a moiety derived from an unsaturated compound polymerized with unsaturated bonds, and may be same or different in each of repeating units.

20. A run-flat tire according to claim 19, wherein A in the formula IV is ethylene group.

* * * * *